United States Patent
Iwamura

(10) Patent No.: US 7,106,906 B2
(45) Date of Patent: Sep. 12, 2006

(54) MOVING IMAGE GENERATION APPARATUS, MOVING IMAGE PLAYBACK APPARATUS, THEIR CONTROL METHOD, AND STORAGE MEDIUM

(75) Inventor: Keiichi Iwamura, Kanagawa (JP)

(73) Assignee: Canon Kabushiki Kaisha, Tokyo (JP)

(*) Notice: Subject to any disclaimer, the term of this patent is extended or adjusted under 35 U.S.C. 154(b) by 1266 days.

(21) Appl. No.: 09/797,717

(22) Filed: Mar. 5, 2001

(65) Prior Publication Data

US 2001/0028463 A1  Oct. 11, 2001

(30) Foreign Application Priority Data

Mar. 6, 2000  (JP) ........................... 2000-060938
May 18, 2000  (JP) ........................... 2000-146942

(51) Int. Cl.
*G06K 9/36* (2006.01)

(52) U.S. Cl. .................................. 382/236; 382/232
(58) Field of Classification Search ............ 375/240.01; 709/247; 382/100, 232, 236, 243; 358/1.1; 370/395.2, 471, 476
See application file for complete search history.

(56) References Cited

U.S. PATENT DOCUMENTS

| | | | | |
|---|---|---|---|---|
| 5,151,793 A | | 9/1992 | Ito et al. .................... 358/335 |
| 5,293,580 A | * | 3/1994 | Shimizu .................... 382/243 |
| 5,343,386 A | | 8/1994 | Barber ....................... 364/400 |
| 5,799,081 A | * | 8/1998 | Kim et al. .................. 380/203 |
| 5,828,848 A | * | 10/1998 | MacCormack et al. ..... 709/247 |
| 5,909,238 A | * | 6/1999 | Nagashima et al. ........... 725/8 |
| 6,072,933 A | | 6/2000 | Green ......................... 386/46 |
| 6,118,456 A | * | 9/2000 | Cooper ....................... 345/619 |
| 6,134,663 A | | 10/2000 | Nakamura et al. .......... 713/201 |
| 6,144,946 A | | 11/2000 | Iwamura ...................... 705/30 |
| 6,148,148 A | | 11/2000 | Wain et al. ..................... 396/2 |
| 6,434,746 B1 | * | 8/2002 | Nagashima et al. ............ 725/5 |
| 6,449,378 B1 | * | 9/2002 | Yoshida et al. .............. 382/100 |
| 6,522,651 B1 | * | 2/2003 | Herrmann ................. 370/395.2 |
| 6,658,058 B1 | * | 12/2003 | Kuroda et al. .......... 375/240.12 |
| 6,792,043 B1 | * | 9/2004 | Takahashi et al. ...... 375/240.01 |

FOREIGN PATENT DOCUMENTS

| | | |
|---|---|---|
| EP | 1 006 726 | 6/2000 |
| JP | 04-104572 | 4/1992 |
| JP | 04-506264 | 10/1992 |
| JP | 10-115866 | 5/1998 |
| JP | 10-117344 | 5/1998 |
| JP | 10-221758 | 8/1998 |

OTHER PUBLICATIONS

Doenges, P. K. et al: "Audio/video and synthetic graphics/audio for mixed media" Signal Processing: Image Communication, Elsevier Science Publishers, Amsterdam, NL, vol. 9, No. 4, (May 1, 1997), pp. 433–463, XP004075338, ISSN: 0923–5965.

* cited by examiner

*Primary Examiner*—Anh Hong Do
(74) *Attorney, Agent, or Firm*—Fitzpatrick, Cella, Harper & Scinto

(57) ABSTRACT

The invention generates moving image information obtained by compositing a moving image of a user and objects selected by the user, and provides the generated moving image information to the user. For instance, when the user has inserted a coin or coins into a device, a select menu of pre-stored stories is displayed, and the user selects one story from the menu. Then, the user selects a desired background scene and feature player in that story to determine pre-stored objects. After that, an image of the user is sensed, and is stored as a moving image object. The moving image object is then composited with the previously selected objects according to MPEG 4 to generate single stream information. The generated moving image information is then delivered to the user.

39 Claims, 22 Drawing Sheets

FIG. 15

INPUT YOUR E-MAIL ADDRESS abcd@efg.com

MOVING IMAGE GENERATION APPARATUS, MOVING IMAGE PLAYBACK APPARATUS, THEIR CONTROL METHOD, AND STORAGE MEDIUM

FIELD OF THE INVENTION

The present invention relates to an apparatus for generating a moving image the user wants, a playback apparatus, their control method, and a storage medium.

BACKGROUND OF THE INVENTION

A print system which composites an image obtained by sensing a user who inserted a coin or coins, and an image prepared in advance, and prints the composited image as a sticker is known. As such system, Japanese Patent Laid-Open Nos. 04-104572 or 04-506264 is available. Such system basically stores some background images, and comprises a camera for taking a picture, a computer for controlling composition of the sensed image with one background image selected from the plurality of background images, image sensing of the camera, and an image print process (to be described below), and a printer for printing out an image obtained by compositing the sensed image and the selected background image. However, these systems and patents are not designed for a moving image.

A system that expands the above system to process a movie-like image is disclosed in Japanese Patent Laid-Open No. 10-115866 or 10-117344. However, the "movie-like image" in such system is a series of photos or panel which can be printed out by a printer, and several still images are merely combined using the aforementioned mechanism. Hence, such system is not designed for an actual moving image.

The reasons why the conventional systems are not designed for a moving image, i.e., problems to be solved upon building a system for a moving image, are as follows.

1) A moving image has a considerably larger information size than a still picture, and the apparatus components such as a memory, image processing means, and the like cannot be efficiently implemented.

2) A still image can easily undergo an image process such as composition between a background image and sensed image, but means for editing a moving image by a simple process is not easily available (except for expensive means such as editing apparatuses for TV, movie, and the like).

3) A moving image is hard to output as a printed image, and is not suitable as a medium that everyone can use.

4) The user can exchange printed images output as stickers with friends, but cannot do so for a moving image due to its large information size.

Even when a moving image is allowed to be easily sent as digital data, the following problems concerning copyrights are additionally posed.

5) When an output is printed matter, it is rarely illicitly copied (image quality inevitably deteriorates even by color copying or the like), but when an output is digital data, copies that are free from deterioration of image quality can be easily formed. If data corresponding to a background scene or feature player is copyrighted, it is difficult to attain copyright protection.

6) Even a copyright-free movie of a certain user violates the right of likeness or privacy of that user if it is illicitly copied and sent.

7) If an output is a sticker or the like, a fee can be charged for one set of a predetermined number of stickers. However, when a digital data output is used to implement the same function, a copy count must be controlled, and a charging system corresponding to the copy count must be built, thus requiring a new technique.

SUMMARY OF THE INVENTION

The present invention has been made in consideration of the above situation, and has as its object to provide a moving image generation apparatus which can offer moving image information services to the users, a moving image playback apparatus, their control method, and a storage medium.

In order to achieve the above object, for example, a moving image generation apparatus of the present invention comprises the following arrangement.

That is, a moving image generation apparatus comprises:

storage means for storing a plurality of compressed objects which specify stream information with respect to a time axis;

input means for inputting video data of a moving image obtained by predetermined image sensing means as the object; and output means for multiplexing at least one desired object of the objects stored in the storage means and the object input by the input means and outputting the multiplexed objects as single stream information.

It is another object of the present invention to provide a moving image output apparatus which controls output of objects contained in a scene, and plays back a bitstream including that scene, a moving image playback apparatus, a portable terminal, their control method, and a storage medium.

In order to achieve the above object, for example, a moving image output apparatus of the present invention comprises the following arrangement.

That is, a moving image output apparatus comprises:

storage means for storing various object data;

input means for inputting moving image data sensed by predetermined image sensing means;

information generation means for generating information data that pertains to a user condition of the object data; and output means for outputting stream data by multiplexing the object data stored in the storage means, the moving image data input by the input means, and the information data generated by the information generation means.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 15 shows an example of an email address input window in the second embodiment of the present invention;

DETAILED DESCRIPTION OF THE PREFERRED EMBODIMENTS

Preferred embodiments of the present invention will be described in detail hereinafter with reference to the accompanying drawings.

[First Embodiment]

Figure 1:
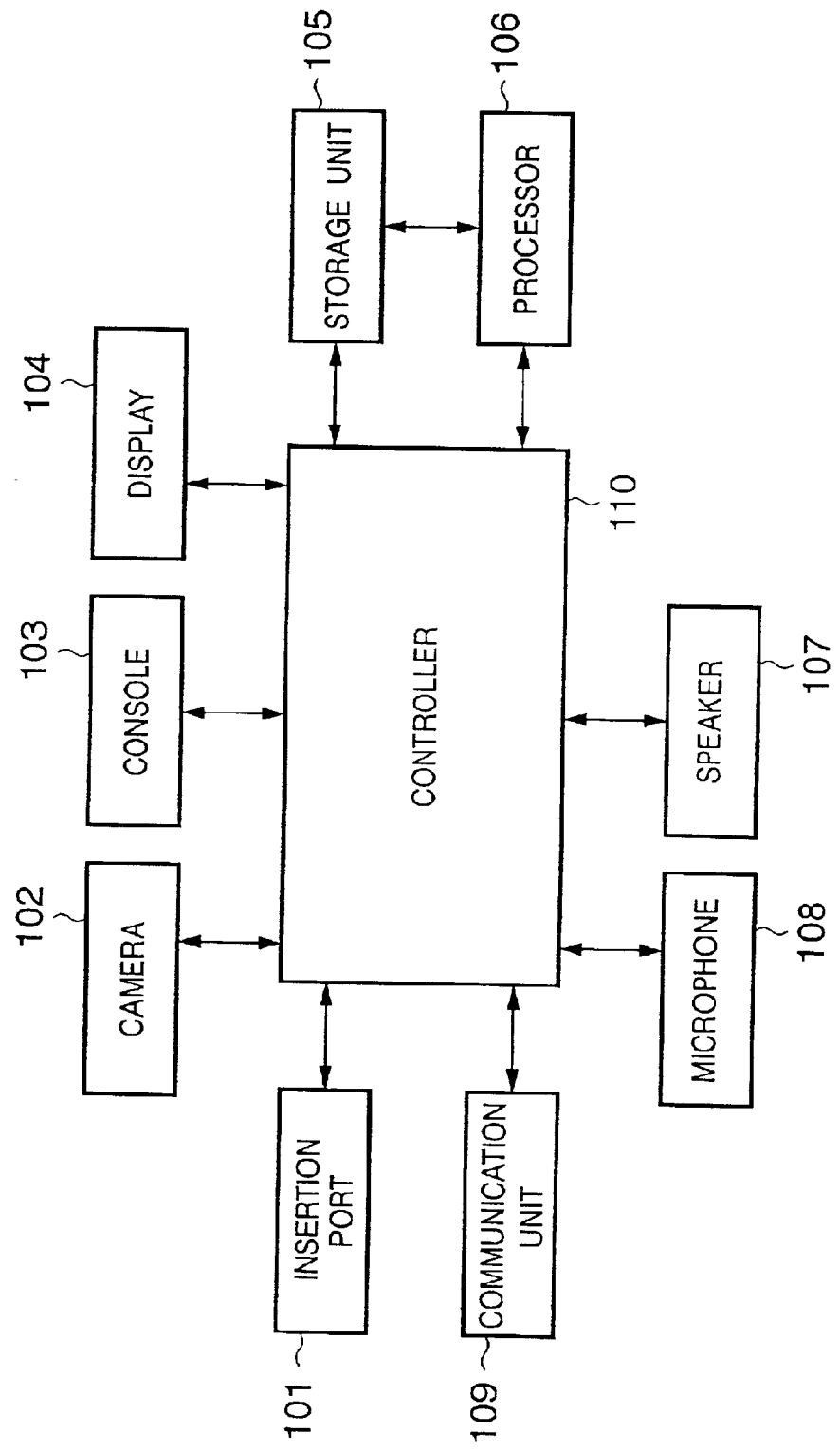
FIG. 1 is a block diagram of an amusement apparatus according to the first embodiment of the present invention.
Figure 2:
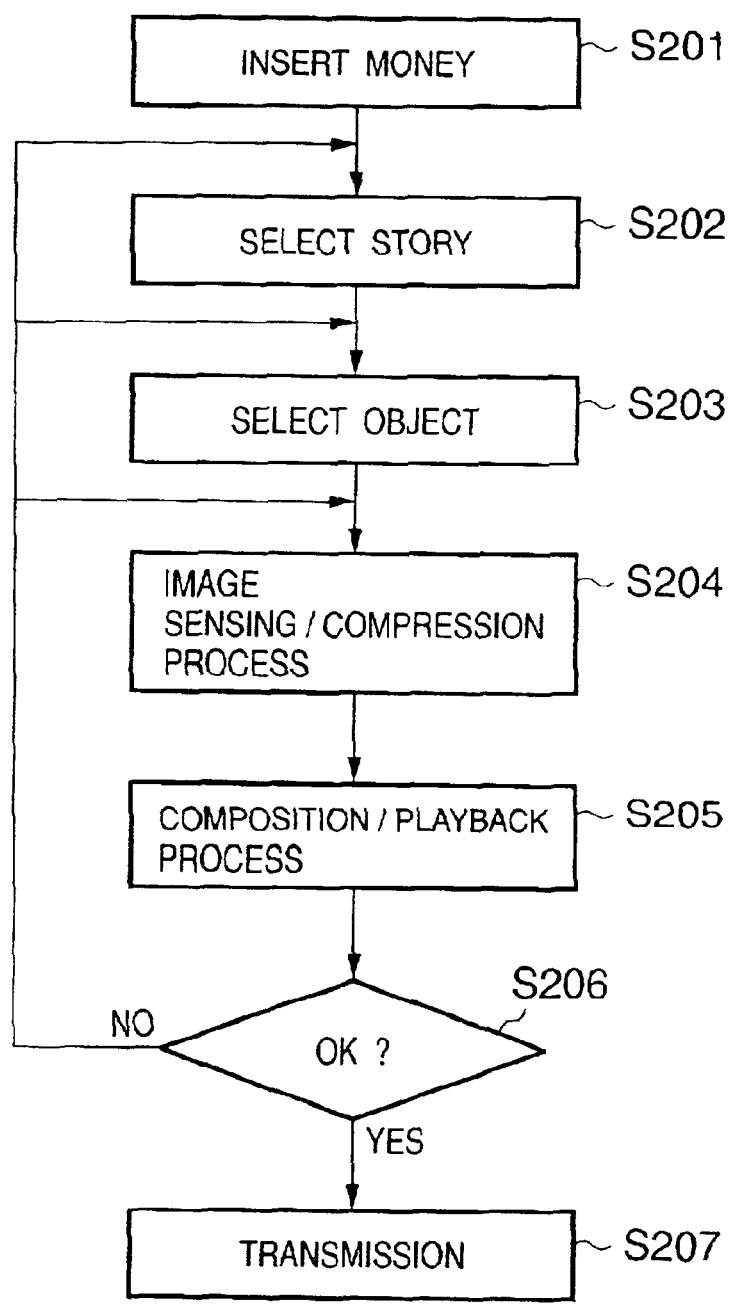
FIG. 2 is a flow chart showing the operation processing sequence of the amusement apparatus of the first embodiment.

FIG. 1 is a block diagram of a moving image amusement apparatus according to the present invention, and FIG. 2 shows its operation flow chart. Note that a program associated with the flow chart in FIG. 2 is stored in a storage means 105 (to be described later), and is loaded onto a RAM (not shown) upon execution.

The user inserts a coin or coins into an insertion port 101 (step S201). Note that the present invention is not limited to coin, but a credit card, or an IC card, prepaid card, or the like having a function of electronically receiving money may be used.

Upon detection of coins in a predetermined amount, a display 104 displays stories prepared in advance in a storage unit 105 (e.g., a storage device such as a hard disk, MO, CD, DVD, or the like) as some selectable menu items via a processor 106 (to be described later), and the user selects a desired story at a console 103 (step S202).

After the story is selected, some background scenes, feature players, and the like corresponding to that story, which are stored in the storage unit 105, are displayed on the display screen of the display 104 via the processor 106, and the user selects a desired background scene, feature player, and the like at the console 103 (step S203). In place of displaying the stories, background scenes, and the like, they may be announced by voice using a speaker (or earphone) 107, and the user may input his or her choice via a microphone 108.

After the story, background scene, feature player, and the like are determined, and when the user inputs a start instruction at the console 103, the motion and voice of the user corresponding to the story are captured as digital moving image information using a camera 102 and the microphone 108. The captured digital information is extracted and compressed by the processor 106 (step S204). After an elapse of a predetermined period of time, the capture process is complete, and the processor 106 composites the compressed sensed information with the selected background scene and feature player and plays back the information using the display 104 and speaker 107 (step S205). The apparatus prompts the user to check if the playback information is OK. If the user inputs a re-input instruction at the console 103, the process can be repeated from step S202, S203, or S204 (step S206). Note that this repetition process may be omitted, and the process may be done only once. Alternatively, the flow may return to step S201, and the user may select a repetition process by inserting extra money.

If the user inputs a confirmation instruction of the playback result, the playback information is transmitted using a communication unit 109 (step S207). As the communication unit 109, various devices are available. For example, since portable terminals (note type PC, PDA, and the like) have prevailed recently, and most of them have wired/wireless communication interfaces such as USB (Universal Serial Bus), IrDA (Infrared Data Association), and the like, a moving image composited by this apparatus is sent as a file to the user's device using such interface.

In the above description, the respective units 101 to 109, and the operation shown in FIG. 2 are controlled by a controller 110 which comprises a CPU, a ROM/RAM for storing programs, and the like.

The processor 160 (including the controller 110) will be described in detail below. In this system, data such as stories, background scenes, feature players, a sensed moving image, audio, and the like (pre-stored in a storage medium such as a hard disk, CD, or the like) are individually processed as compressed objects. These objects are compressed/expanded, composited, and played back when they are used. As a mechanism for implementing a composition process of a plurality of objects, MPEG-4 (Moving Picture Experts Group Phase4) which is standardized by ISO can be used.

Figure 3:
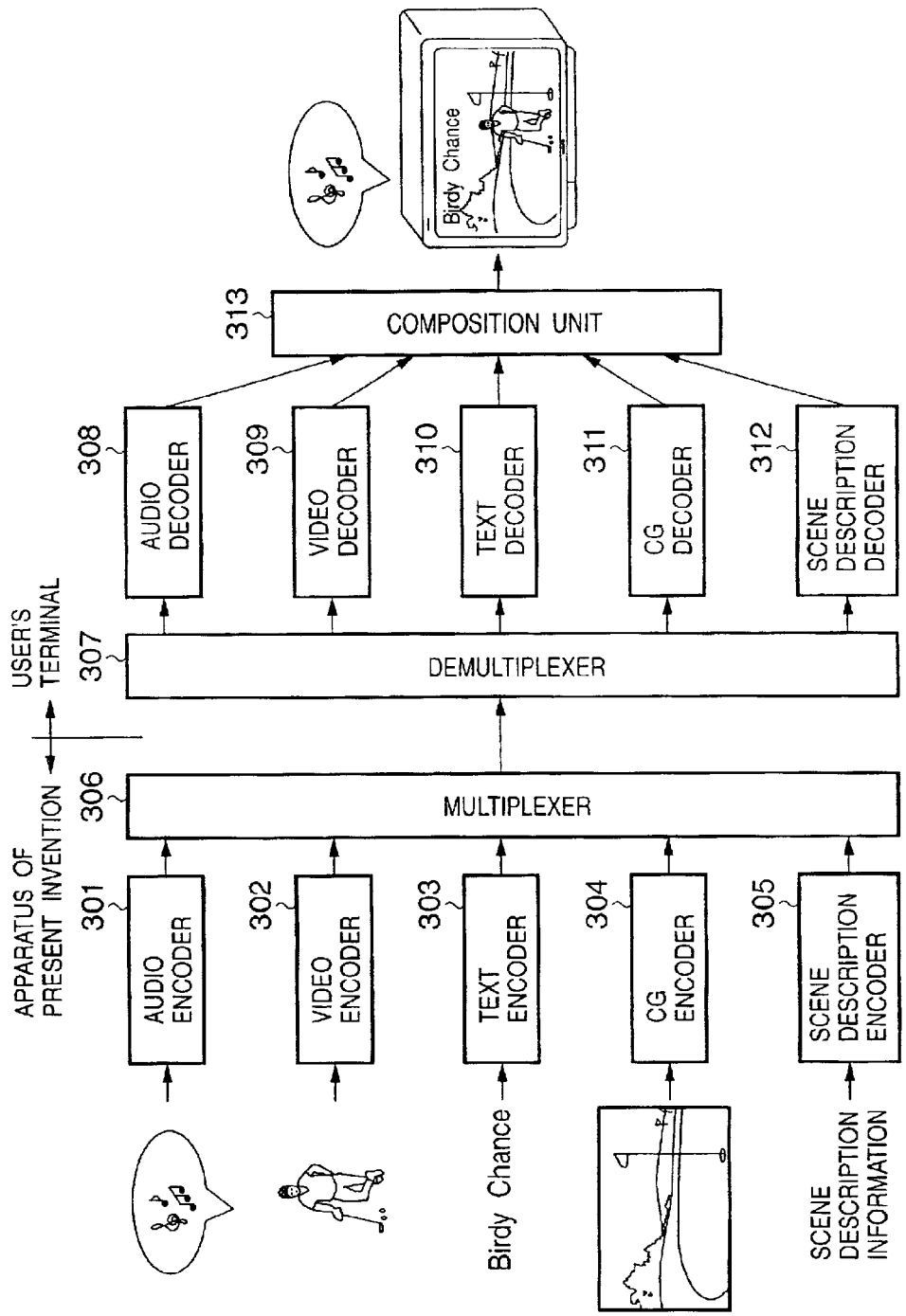
FIG. 3 is a diagram for explaining MPEG-4.

MPEG-4 is a scheme for encoding moving image data, audio data, and the like, handling individual encoded data as objects, combining these so-called multimedia data, and sending them as a single bitstream. Since individual data are handled as objects, the received bitstream can be easily decomposed into objects, such as audio objects, video object, text objects, and the like, and can be reassembled. FIG. 3 illustrates this process. In FIG. 3, blocks for encoding respective objects (301 to 305 in FIG. 3), and multiplexing the encoded objects (306) correspond to the apparatus of this embodiment, and blocks for demultiplexing the multiplexed stream (finally saved as a file in the user's terminal) (307), and decoding individual objects (308 to 312) and composition unit 313 for composing the decoded objects correspond to software of the user's terminal.

As a scheme for compositing these objects to obtain a given scene, BIFS (Binary Format For Scenes) obtained by modifying VRML (Virtual Reality Modeling Language) is known. This BIFS is called scene description information and is described in binary, and a scene is composited according to BIFS. Since individual objects required for such scene composition independently undergo optimal encoding and are sent, the decoding side (user's terminal) independently decodes objects, and composites and outputs a scene by synchronizing the time axes of the individual data with that inside a player in accordance with the description of BIFS.

Figure 4:
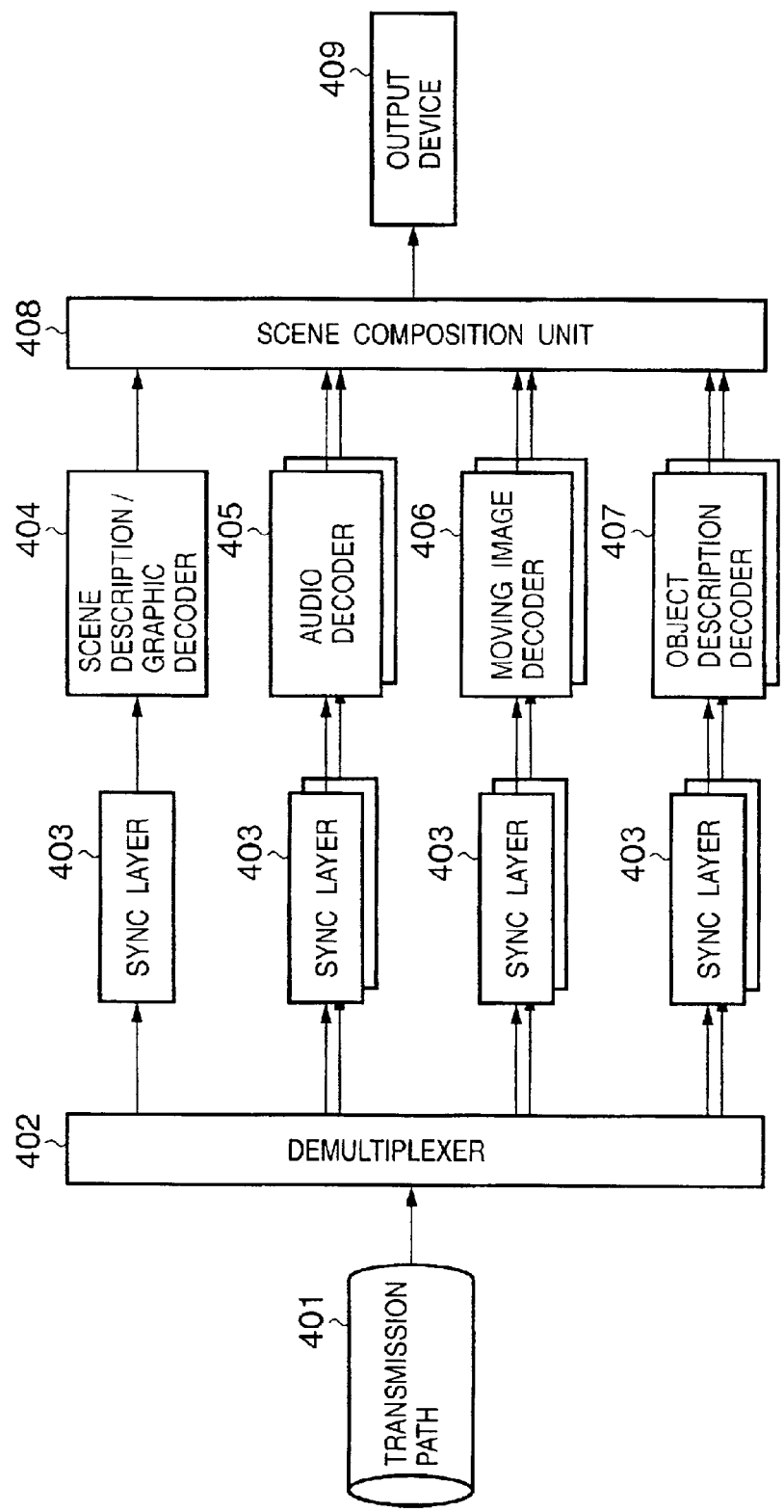
FIG. 4 is a block diagram of an MPEG-4 player.

FIG. 4 shows a schematic arrangement of a general MPEG-4 player. A transmission path 401 is a data path such as various networks, computer bus, and the like, and is a network to which an MPEG-4 stream is input. Note that the transmission path also means an interface between the player and a recording medium device such as a CD-ROM, DVD-ROM, DVD-RAM, or the like in addition to the communication path. In the player, an MPEG-4 stream delivered from the network or played back from the recording medium device is input to a demultiplexer 402. The MPEG-4 stream is demultiplexed by the demultiplexer 402 into scene description data, moving image object data, audio object data, object description data, and the like, which are respectively input to corresponding sync layer blocks (buffer memories) 403. Note that the audio object data has undergone high-efficiency (compression) coding such as known CELP (Code Excited Linear Prediction) coding, transform-domain weighted interleave vector quantization (TWINVQ) coding, or the like. Also, the moving image object data has undergone high-efficiency coding by, e.g., known MPEG-2, H-263, or the like.

The respective object data of the sync layer blocks 403 are input to corresponding decoders 404 to 407. The decoders 404 to 407 decode the aforementioned scene description data, moving image object data, audio object data, and the like which have undergone high-efficiency coding. In FIG. 4, the MPEG-4 bitstream contains a plurality of different types of objects in each of audio objects, moving image objects, and object description data since this embodiment assumes an apparatus which can decode these objects. For this reason, a plurality of sets of sync layer blocks and decoders 404 to 407 are prepared in correspondence with audio objects, moving image objects, and object description data, but they can be modified depending on the systems used.

The audio objects, moving image objects, and object description data decoded by the decoders 405 to 407 undergo a composition/graphic process in a scene composition unit 408 on the basis of the scene description data decoded by the scene description decoder 404. A final data sequence obtained in this way is supplied to an output device 409 such as a display, printer, or the like, and is visualized and made audible.

Hence, the stories stored in the storage unit 105 correspond to scene description data of BIFS, and background scenes, feature players, and the like are managed as compressed objects in units of data (scene description data is also managed as one compressed object). For this reason, even a moving image requires a small information size to be stored.

Figure 10:
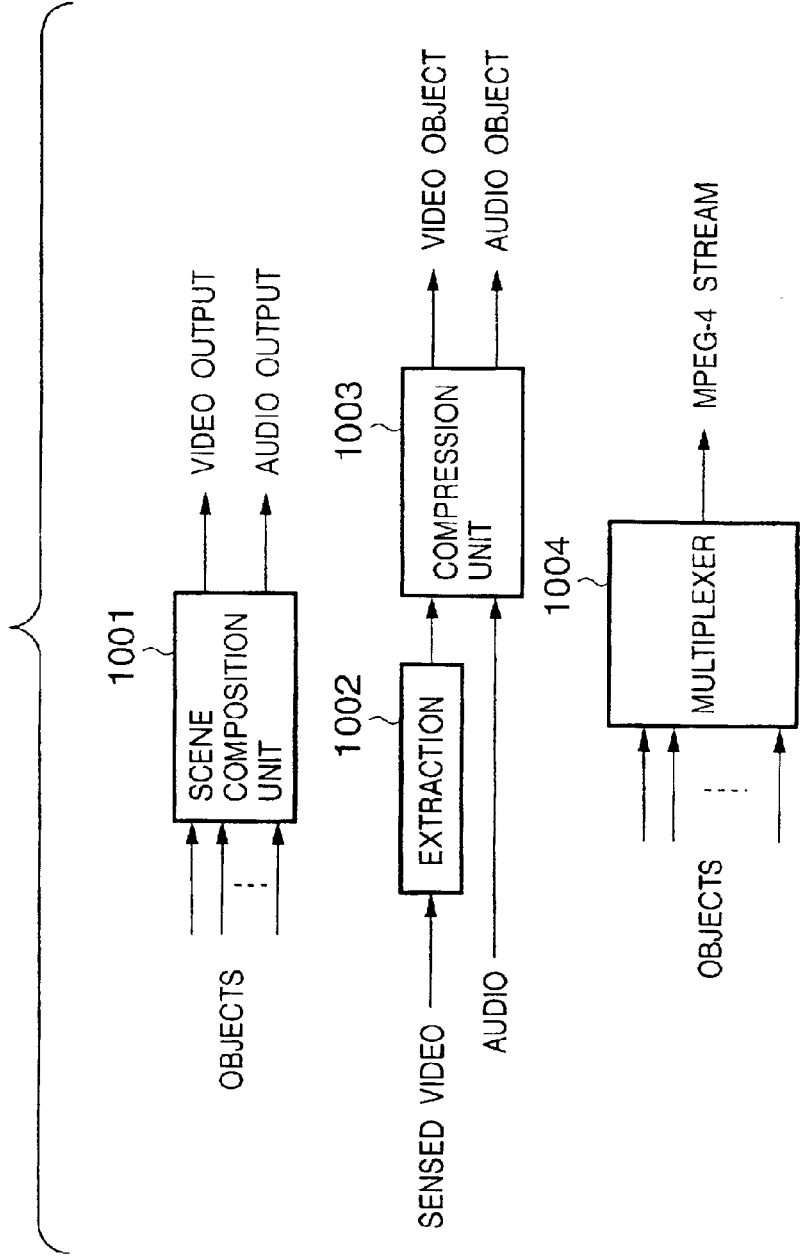
FIG. 10 is a block diagram of a processor of the first embodiment.

The processor 106 has an arrangement shown in FIG. 10. The image sensing/compression process (step S204) in FIG. 2 is executed by an image extraction unit 1002 and compression unit 1003. An image extraction scheme is not specified in MPEG-4. For example, the extraction unit 1002 may comprise means for implementing a known chroma-key separation method that sets the background in specific color (blue back or the like), and separating pixels of that color as those outside an object. The compression unit 1003 is implemented by the aforementioned MPEG-2 moving image encoder, CELP audio encoder, and the like, thus outputting video and audio objects.

The composition/playback process (step S205) is executed by a scene composition unit 1001. This scene composition unit 1001 comprises the components 403 to 408 shown in FIG. 4. That is, the respective objects stored in the storage unit 105 and the compressed sensed moving image are individually input to the sync layer blocks 403, and undergo decoding corresponding to individual encoding schemes of scene description, audio, moving image, and the like. The decoded objects are composited into a scene by the scene composition unit 408, and are output as signals to the display 104, speaker 107, and the like.

In this embodiment, objects that explain stories, and objects indicating selectable background scenes, feature players, and the like (steps S202 and S203) are prepared in advance, and information obtained by capturing and encoding a video sensed by the camera 102 is handled as one object. That is, these various objects can be implemented by the scene composition unit 1001. The last transmission process (step S207) can individually send objects, but can easily send a story and a plurality of objects based on that story as an MPEG-4 stream using the multiplexer 306 in FIG. 3 like 1004 in FIG. 10.

Upon executing composition/playback process (step S205), various effects such as fade-out, color change, and the like can be added by a known edit process.

Figure 5:
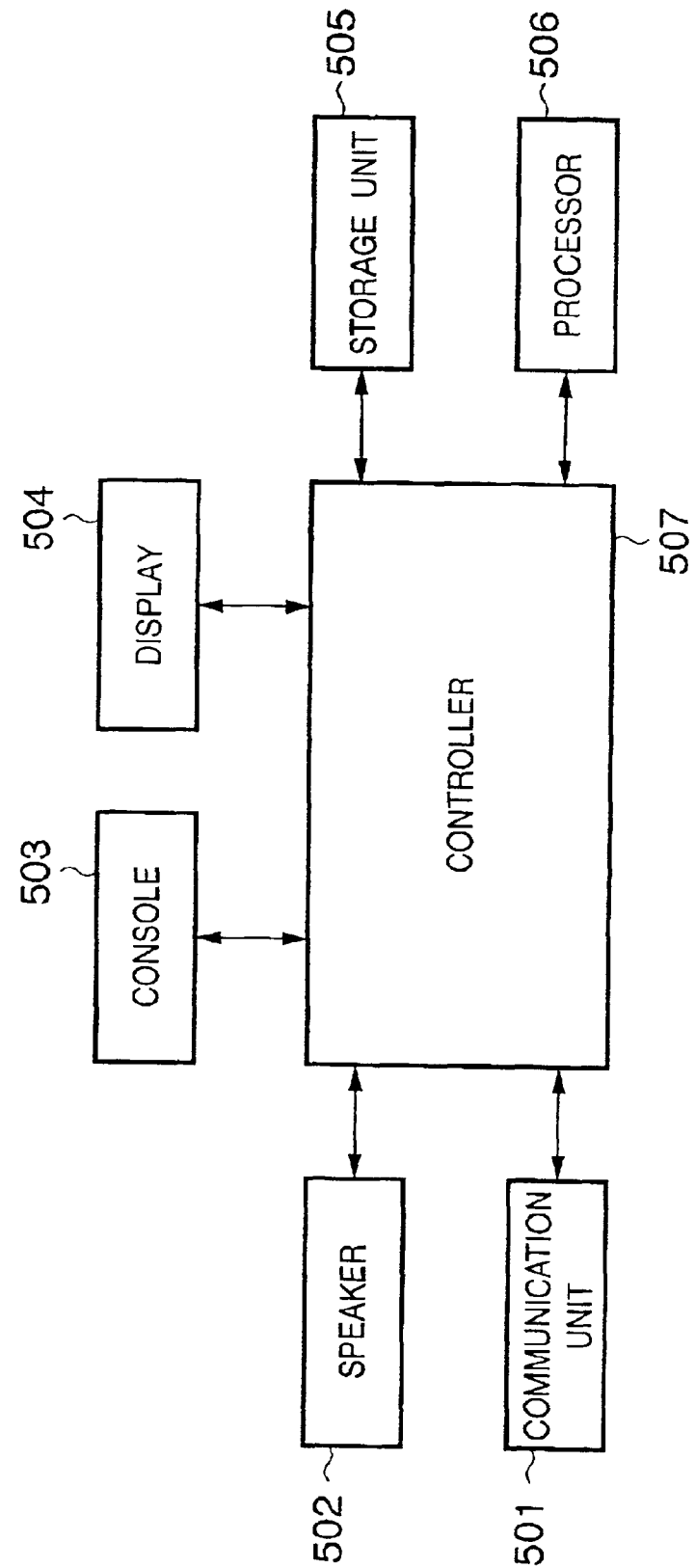
FIG. 5 is a block diagram of a portable terminal according to the embodiment of the present invention.
Figure 6:
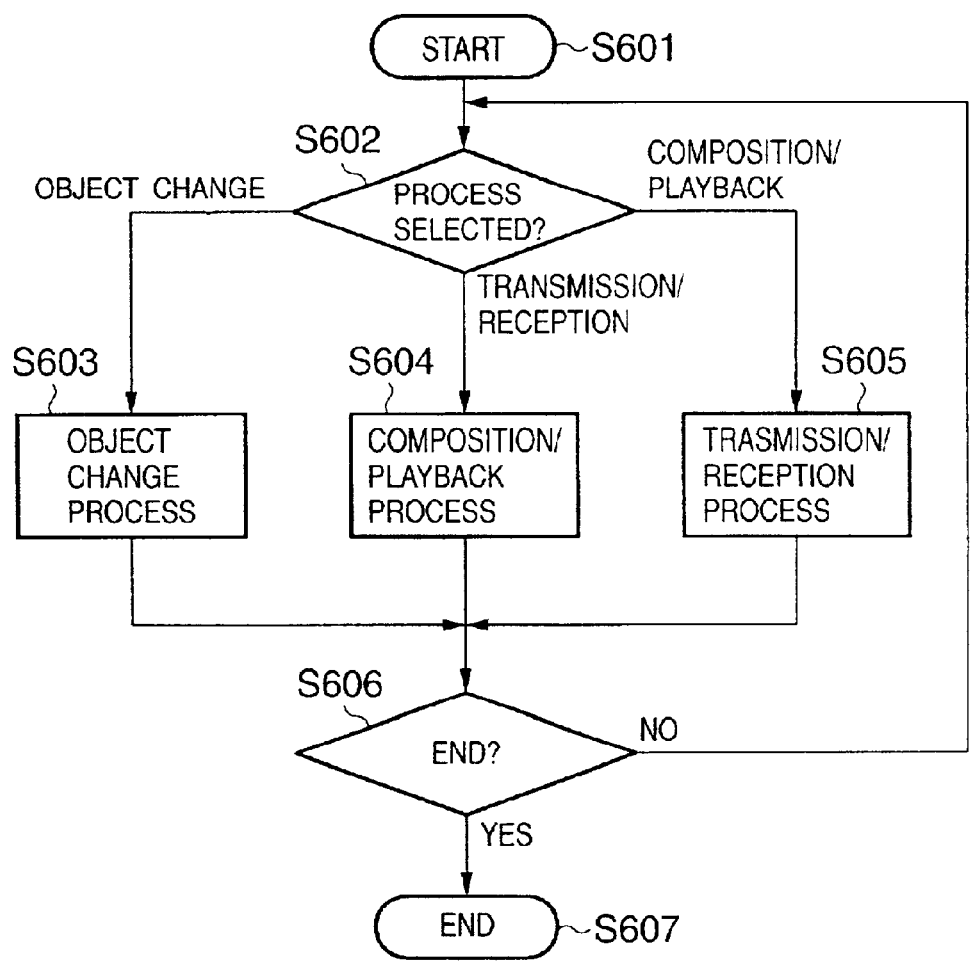
FIG. 6 is a flow chart showing the processing sequence of the portable terminal of the first embodiment.

FIG. 5 is a block diagram of the user's portable terminal in this embodiment, and FIG. 6 shows its operation flow. This portable terminal has a communication function of receiving objects created by the aforementioned process, and also a function of allowing the user to individually enjoy contents by compositing and playing them back.

The portable terminal of this embodiment can display some processing menu items on a display 504, and the user can select a process using a console 503. The menu includes a process for sending/receiving objects, a process for compositing/playing back a moving image, a process for changing each object, and the like.

The user selects a process from the menu displayed on the display 504 (step S602). Assume that the user selects the transmission/reception process.

In this case, the flow advances to step S605, and objects are received from the aforementioned amusement apparatus of this embodiment or another portable terminal using a communication unit 501. In this step, a process for transmitting objects to another terminal is done. Assume that objects (including BIFS corresponding to a story) created by another apparatus/terminal are received. This transmission/reception instruction is issued at the console 503, and objects received via the communication unit 501 are stored in a storage unit (a storage device such as a hard disk or the like) 505. In the transmission process, objects stored in the storage unit 505 are designated using the display 504 and console 503, and are-transmitted to another portable terminal via the communication unit 501. In order to confirm objects to be transmitted/received, the video and audio of those objects may be played back via a processor 506 (to be described later), and may be stored or transmitted after confirmation.

If the user selects the composition/playback process, the flow advances to step S604, and objects which are stored in the storage unit 505 and form the story are played back via the processor 506 using the display 504 or a speaker 502. The processor 506 can be implemented by the scene composition unit 1001 in FIG. 10.

If the user selects the object change process, the flow advances to step S603. In this step, by adding objects via a communication with another terminal in step S605, objects contained in one story stored in the storage unit 505 may be replaced by those added objects, or those objects may be added to the story. Such process is implemented by rewriting information called a descriptor which indicates the attribute of each object or information described in BIFS within an allowable range.

It is then checked if the process is to end (step S606). For example, after some objects are received from the amusement apparatus of the embodiment mentioned above or another portable terminal and are stored by the transmission/reception process in step S605, the process may proceed to confirm the contents of the received objects by selecting the composition/playback process in step S604. Furthermore, the process may proceed to repeat the composition/playback process in step S604 while executing the object change process in step S603. Finally, the process ends.

When information received from the amusement apparatus or the like is an MPEG-4 stream multiplexed by a multiplexer 306 in FIG. 3, the processor 506 include the demultiplexer 402. The outputs from the demultiplexer are supplied not to the sync layer blocks but to the storage unit 505. A controller 507, which comprises a CPU, a ROM/RAM for storing programs, and the like, controls the respective units 501 to 506, and the operation shown in FIG. 6.

As described above, according to the first embodiment, a moving image of the user can be provided together with the background scene and feature player designated by the user in accordance with the story of user's choice.

The user's portable terminal need not be a special one and can use a versatile information processing apparatus (personal computer or the like), since it can be implemented by software as long as it comprises a communication means.

A moving image amusement system using the amusement apparatus, portable terminal, and the like of the above embodiment will be explained below using FIGS. 7 to 9.

Figure 7:
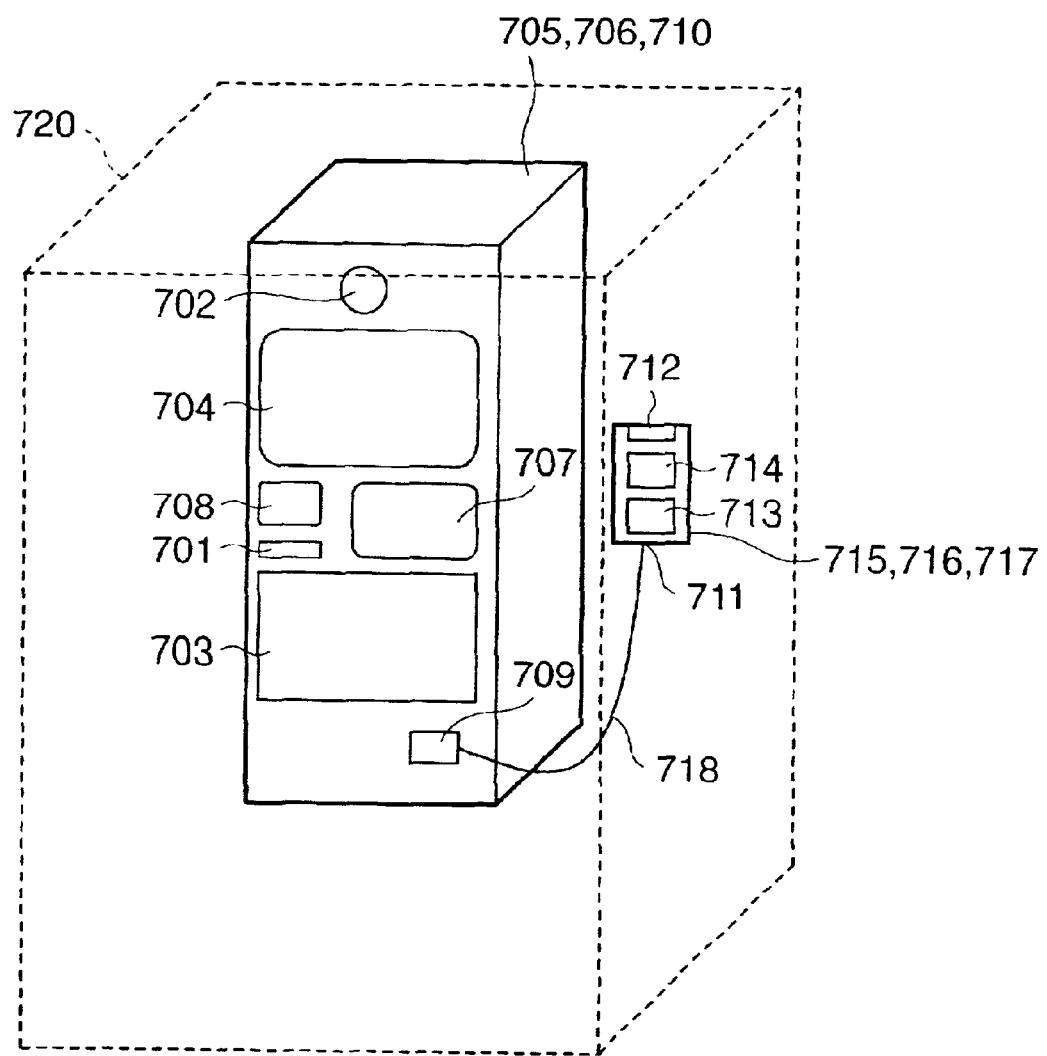
FIG. 7 shows an example of system arrangement of the first embodiment.

Devices 701 to 710 shown in FIG. 7 respectively correspond to 101 to 110 shown in FIG. 1. Note that a storage unit, processor, and controller corresponding to 705, 706, and 710 are built in that apparatus. A box 720 houses an amusement apparatus, and has an interior painted to provide a blue back, and a door (not shown) through which the user enters the box. The blue back is one scheme for extracting objects, and when the moving image of the user in the box is sensed by the camera 702, it is captured as one object that does not contain any images other than that of the user. Note that the component 720 need not have a box shape, but may be a curtain or the like that can provide only a blue back background. When the user has inserted a coin or coins and made predetermined operation, recording is done for a predetermined period of time. The sensed video is displayed on the display device 704 in real time, and the user can confirm it. At this time, image sensing conditions (story, feature player, background) the user sets are displayed together.

An example of the operation is as follows.

Figure 11:
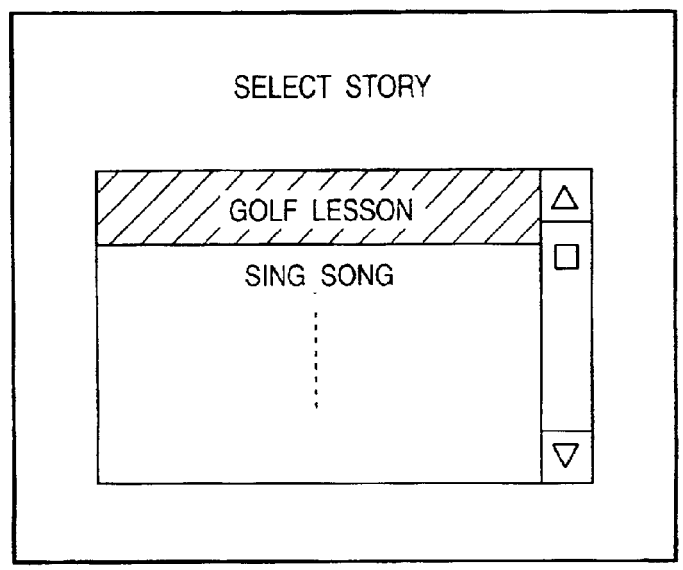
FIG. 11 shows an example of a story select menu in the first embodiment.
Figure 12:
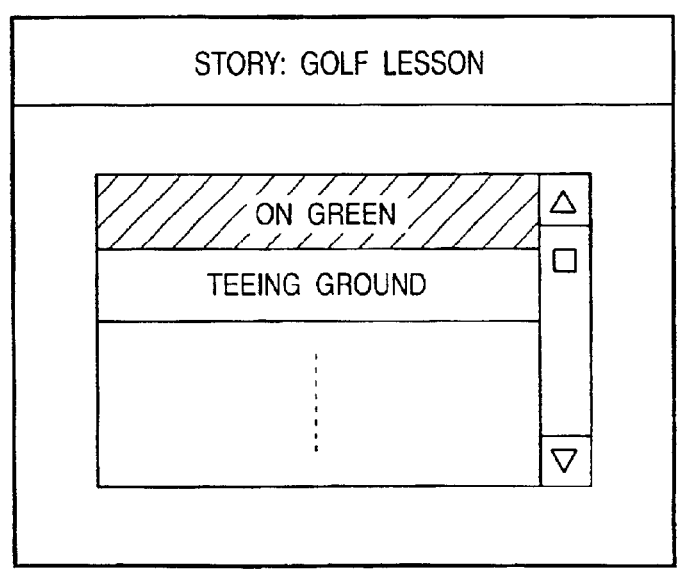
FIG. 12 shows an example of a background select menu in the first embodiment.
Figure 13:
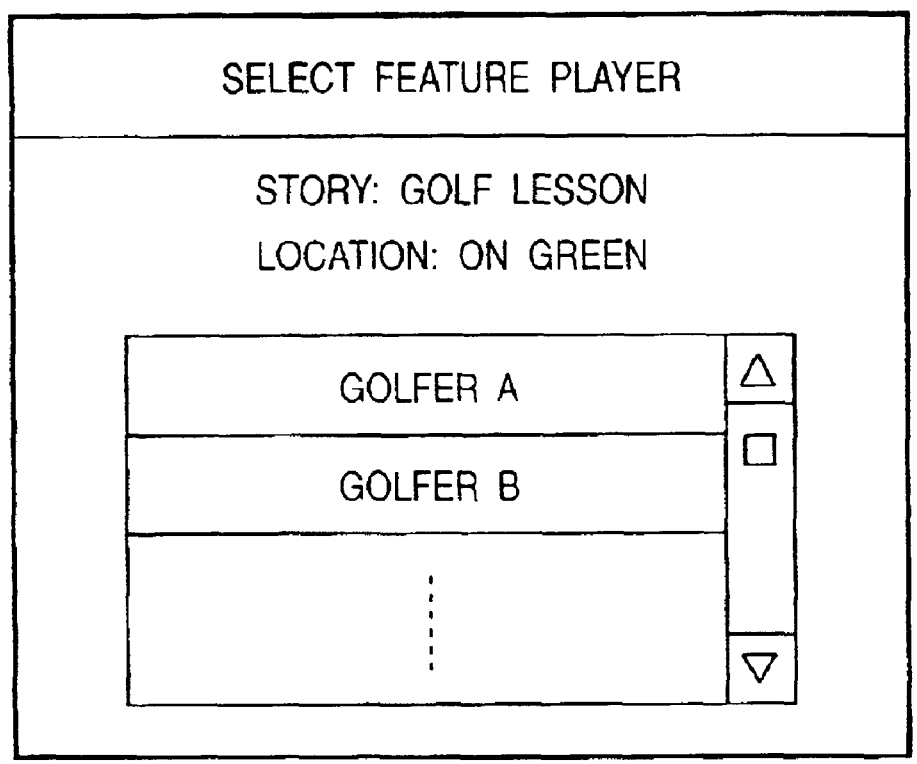
FIG. 13 shows an example of a feature player select menu in the first embodiment.

When the user has inserted a coin, a menu shown in FIG. 11 is displayed. The user selects a desired story (situation) using the console 103. In a default state, the uppermost item ("golf lesson" in FIG. 11) is selected, and the cursor can move to other items by operating an up or down key on the console 103. When the user has selected a desired item and pressed an OK key on the console 103, a screen shown in FIG. 12 is displayed. In this case, a background scene is selected in practice. If the selected story is "golf lesson", a list of background scenes associated with golf are displayed, and the user selects one of these images. After that, a feature player select screen is displayed, as shown in FIG. 13. The user selects a favorite feature player on this screen. When the user has selected the background scene and feature player, and instructed start of recording on the console 103, image sensing of the camera 102 starts, and the playback image of the selected feature player is displayed on the selected background scene. The user talks or acts in correspondence with the display. Note that the image sensing time is fixed, and the remaining time is displayed on the display screen. In this way, the user can recognize the remaining time. The image of the user is extracted from an image sensed by the camera 102 and including other portions by a known chroma-key separation method, and the extracted image is saved as an object.

The object as the image of the user is handled as one object in a scene description file prepared in advance in association with the story. That is, the display position of the user is determined depending on that scene description.

Upon completion of image sensing, the composition process is executed to form one moving image stream file. Then, a message that prompts the user to connect his or her portable terminal is displayed on the display screen, and when the user inputs a transfer instruction at the console 103, the file begins to be transferred to the user's terminal.

Figure 14:
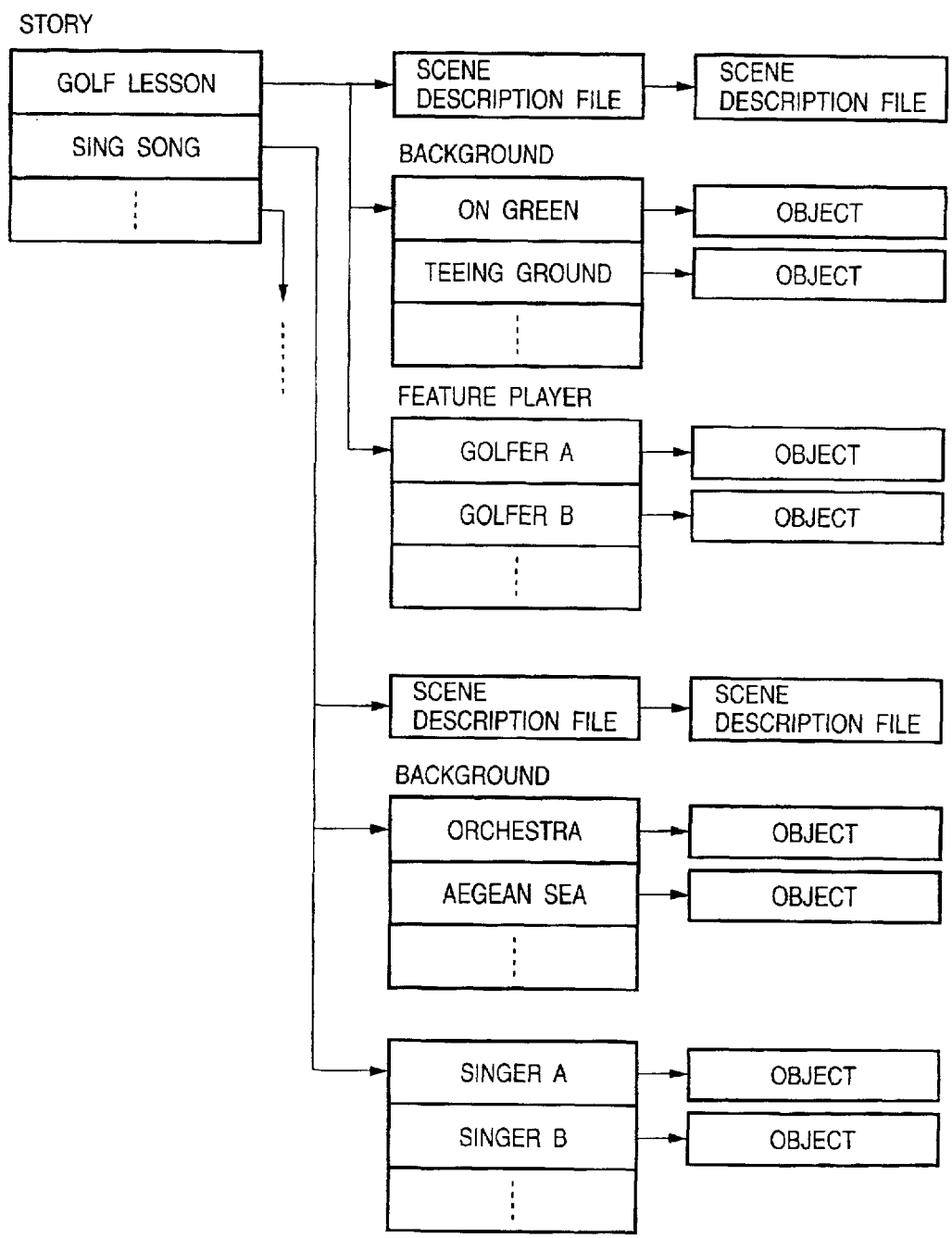
FIG. 14 shows an example of the data structure stored in a storage unit 105 of the first embodiment.

To implement the aforementioned process, the storage unit 105 pre-stores and manages various objects as a database, which has a structure shown in, e.g., FIG. 14.

That is, stories are managed in the uppermost layer, and scene description files, and selectable background and feature player objects are hierarchically managed under the corresponding stories. When "golf lesson" is selected, as described above, a corresponding scene description file is selected, and the selectable background scene and feature player are selected from those depending on the selected story.

When the user has a portable terminal comprising components 711 to 717 (corresponding to 501 to 507 in FIG. 5), he or she can connect the terminal to a communication unit of the amusement apparatus via a component 718 (wired/wireless communication means). In this way, the user can receive objects generated by the amusement apparatus by his or her portable terminal, can save them as a file, and can play it back as needed.

Figure 8:
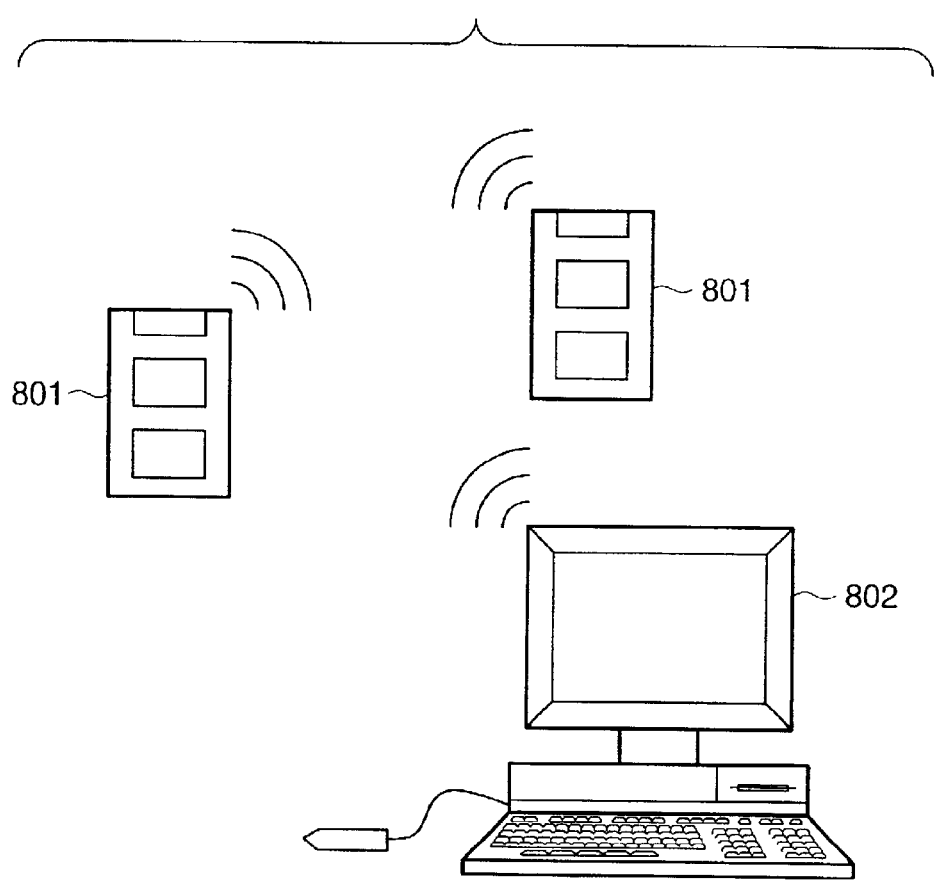
FIG. 8 shows another example of system arrangement of the first embodiment.

As shown in FIG. 8, the portable terminal can communicate with another portable terminal or a computer (to be referred to as a PC hereinafter) that can execute a process to be described later. The PC can exchange objects with another portable terminal via communications, and composites/plays back a moving image as long as it can execute the process shown in FIG. 6. Furthermore, the PC can generate new BIFS or can edit the existing BIFS corresponding to objects or a story. Such object generation/edit process can be implemented by a CG/animation editor or the like, and BIFS generation/edit process can be implemented by a normal editor or the like although BIFS knowledge is required. Also, tools for easily generating/editing objects, BIFS, and the like may be delivered as a software package via a CD, software downloading, or the like. In this way, the user can enjoy a moving image using an original story or objects.

In the above embodiment, the portable terminal has been explained as a destination of information generated by the apparatus of the present invention. Alternatively, a storage medium (e.g., a memory card) may be the destination.

[Second Embodiment]

In the above embodiment, the user must possess a portable terminal. In the second embodiment of the present invention, moving image information containing an image of the user can be provided even if the user does not possess any special device.

In the second embodiment, a file generated by compositing a plurality of objects is sent to, e.g., the mail address of the user. As a result, the user can receive that mail at home, and can play it back.

The apparatus can be realized when the communication unit 109 in FIG. 1 comprises an arrangement for connecting the Internet.

Figure 15:
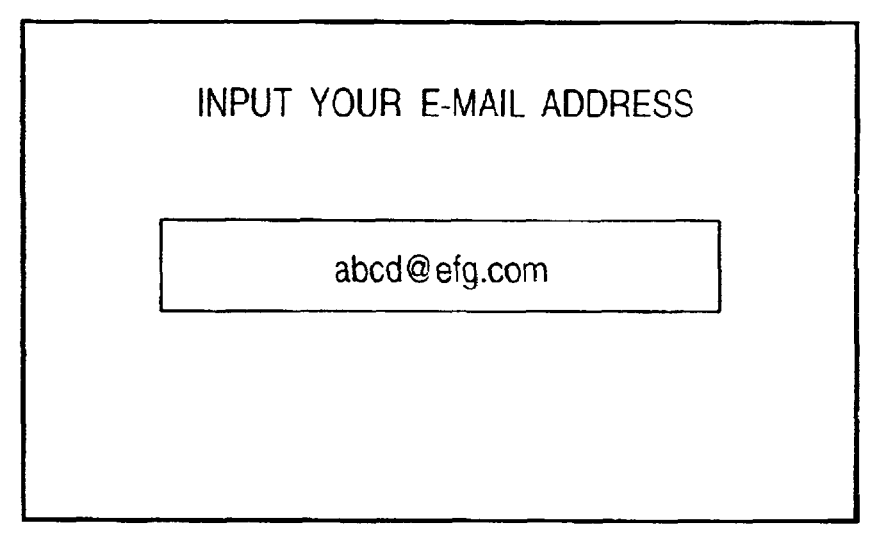

The user must input his or her own email address in addition to the aforementioned operation. FIG. 15 shows an email address input window displayed on the display 104. When the user operates the console 103 to input his or her own email address and then operates a confirmation key (not shown), the generated moving image file is sent to the email address of that user. Note that the mail address may be input before step S202 or step S207 in FIG. 2, or the like. In step S207, the file is sent to the designated email address.

In some cases, the user may input a plurality of email addresses. In this case, the user can send the file to his or her friends.

Note that the second and first embodiments may be combined. In this case, a message for prompting the user to select an email address or the user's portable terminal as a destination is displayed, and the file can be output in the procedure of the first or second embodiment according to the selected contents.

Moreover, the function of the potable terminal mentioned above can be added to a cellular phone having e-mail function, it becomes convenient for the user.

[Third Embodiment]

In the first and second embodiments, a composite moving image containing a sensed image of the user is output to the user's portable terminal or designated email address. Alternatively, the moving image generated by the apparatus of the present invention may be uploaded to a specific server on the Internet.

That is, moving image files generated by the amusement apparatus of-the present invention are managed by a single agent. However, if many unspecified persons can access such files via the Internet, it is not preferable in terms of privacy. To solve this problem, upon completion of sensing of an image of the user, a URL upon browsing and a receipt number are issued, and a message for prompting the user to input a password is displayed on the display screen. Then, the generated composite moving image file, receipt code, and password are uploaded to the specific server to ask it to manage them.

In this case, the step of informing a receipt code and the step of inputting a password may be inserted immediately before step S207, and a file and the like may be sent to a predetermined server in step S207.

Figure 9:
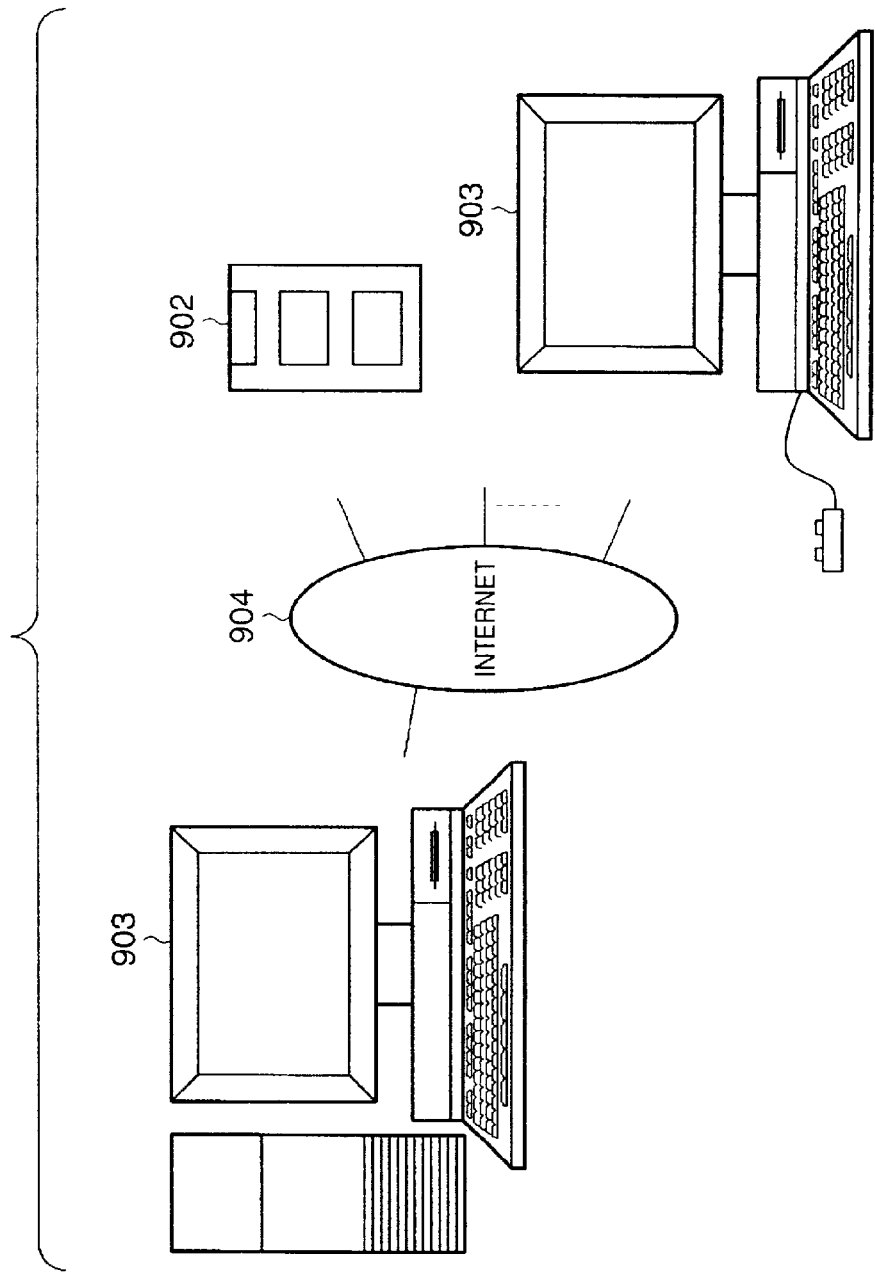
FIG. 9 shows still another example of system arrangement of the first embodiment.

As a result, as shown in FIG. 9, a server 901 stores and manages moving image files transferred from respective amusement apparatuses, and the user accesses the server 901 using his or her portable terminal 902 or 903. When the user accesses the server, an input window of the receipt number and password is displayed, and after authentication, the corresponding file is transferred to the user using, e.g., an FTP protocol.

Therefore, when the user informs his or her friends of the URL, receipt code, and password via some means (email or phone message), he or she can give his or her friends an opportunity to observe user's moving image. Note that the server 901 may require the user payment of a registration/management fee of objects and sales commission.

[Fourth Embodiment]

In the above embodiments, various objects are pre-stored in the storage unit 105 of the amusement apparatus. However, in order to prevent the user from wearying, data of background scenes, feature players, and the like are preferably added and updated appropriately. In the fourth embodiment, the communication unit 109 used in the second and third embodiments accesses a specific server, e.g., once a week to download data of new background scenes, feature players, and scene description files, if they are available, and to register them in the database of the storage unit 105.

Figure 16:
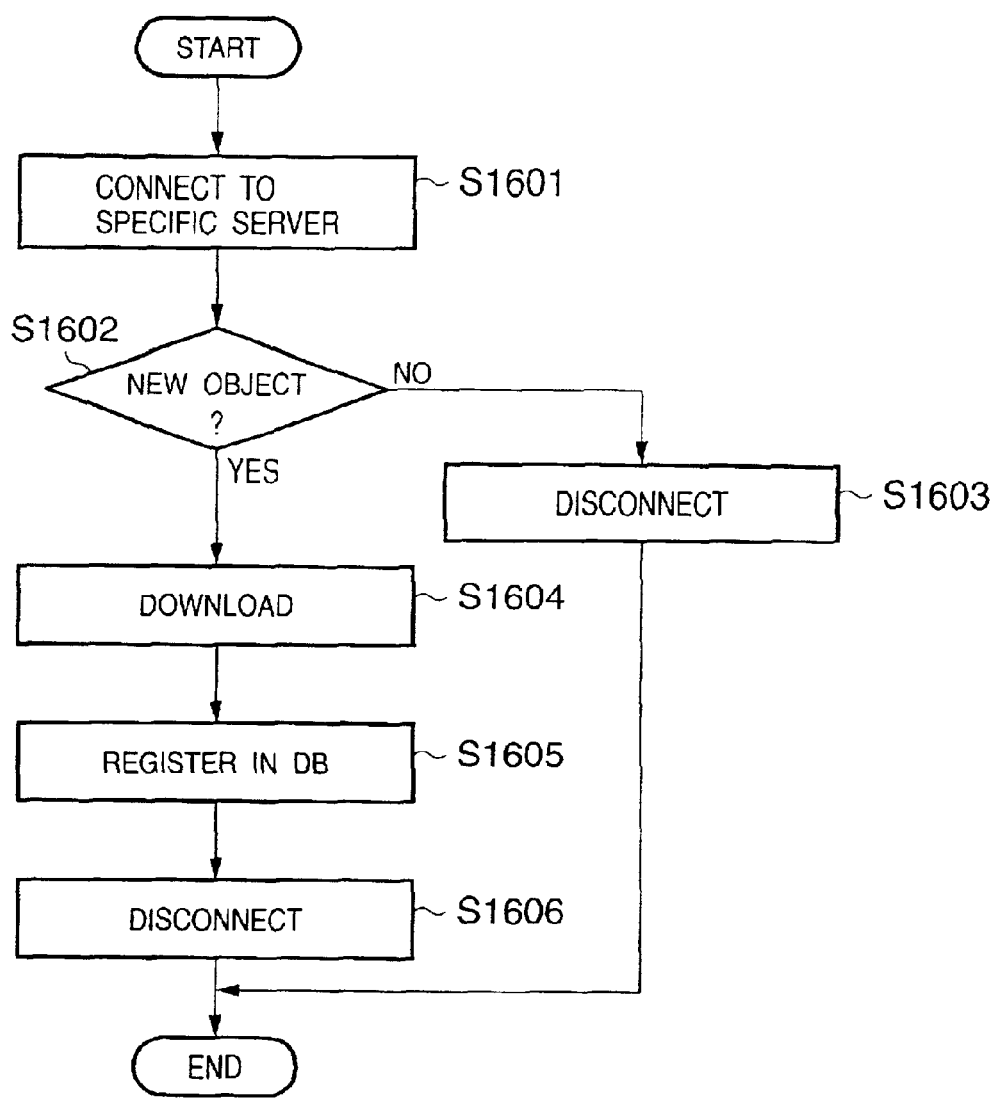
FIG. 16 is a flow chart showing the DB update operation processing sequence of an apparatus in the fourth embodiment of the present invention.

In this case, the controller 110 can execute a process shown in FIG. 16.

In step S1601, the amusement apparatus connects a server (a server managed by the management company of the amusement apparatus of the present invention) that manages objects on the Internet via the communication unit 109. It is then checked in step S1602 if the server stores a new object (scene description file, background scene, feature player). If NO in step S1602, the connection is disconnected in step S1603, and this process ends.

On the other hand, if it is determined that a new object is available, the flow advances to step S1604 to download that object. The downloaded object is registered in the database of the storage unit 105 in step S1605, and the connection is disconnected in step S1606, thus ending this process.

Note that object types include scene description files, background scenes, and feature players, and can be discriminated from each other by describing the type in their files. For example, upon registering an object of "feature player X", the position of the tree structure shown in FIG. 14 where the object is to be registered must be determined. In this embodiment, that position can be determined by a storage destination described in the corresponding file. Also, other determination methods may be used.

[Fifth Embodiment]

In the first to fourth embodiments, since a moving image is generated as digital data, and objects to be composited may be copyrighted in some cases, it is desired to prevent illicit copies.

Hence, the fifth embodiment will exemplify a measure taken against such copies. For the sake of simplicity, the fifth embodiment will be explained in correspondence with the first embodiment, but may be applied to any of the second to fourth embodiments.

Figure 17:
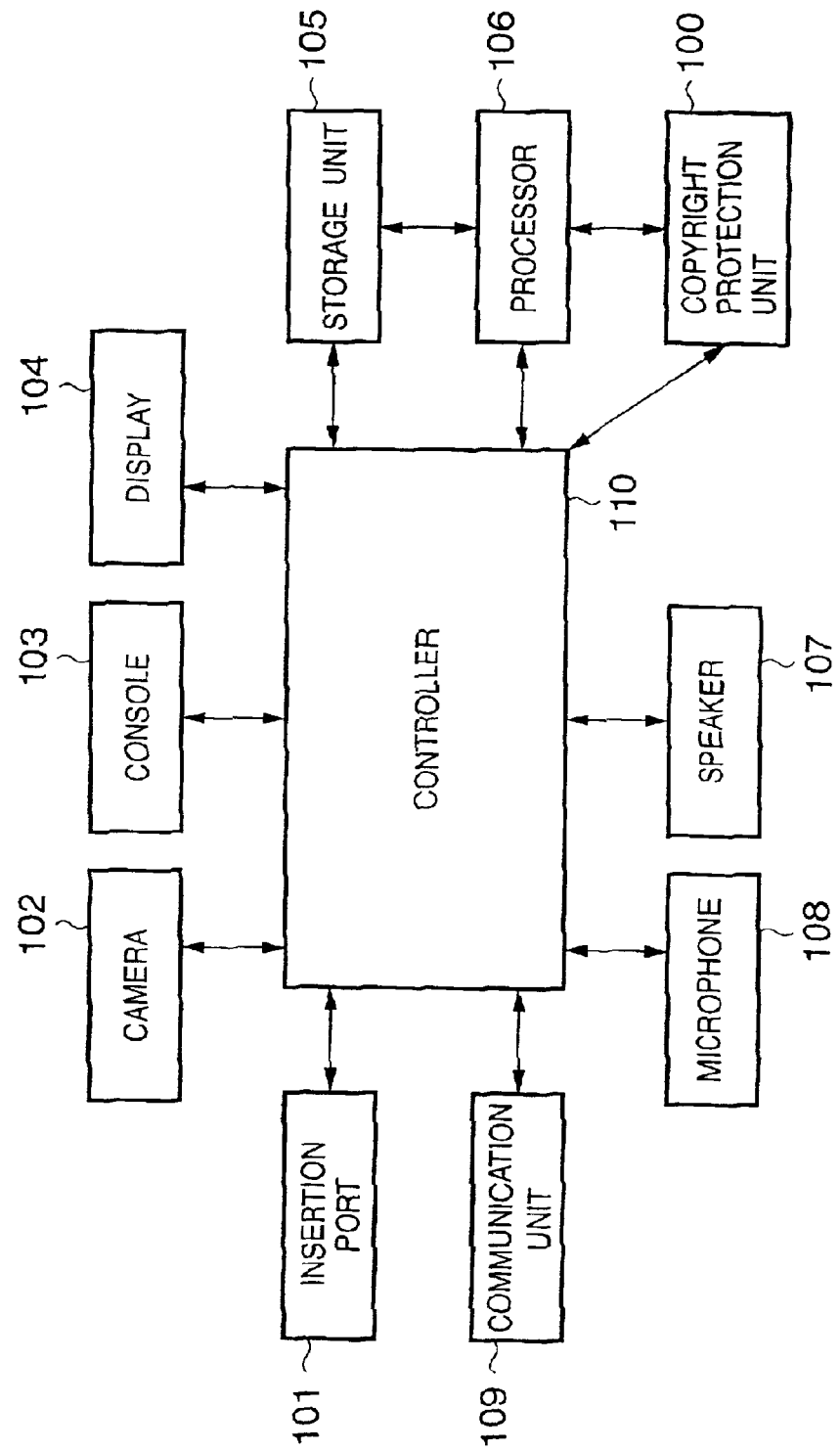
FIG. 17 is a block diagram of a moving image output apparatus according to the fifth embodiment of the present invention.

The arrangement of the amusement apparatus is substantially the same as that shown in FIG. 1, except that a copyright protection unit 100 is added, as shown in FIG. 17. The operation processing sequence of this embodiment will be described below using FIG. 18.

The user inserts a coin or coins into the insertion port 101 (step S1801). Note that the present invention is not limited to coin, but a credit card, or an IC card, prepaid card, or the like having a function of electronically receiving money may be used.

Upon detection of coin insertion, the display 104 displays stories prepared in advance in a storage unit 105 (e.g., a storage device such as a hard disk, MO, CD, DVD, or the like) as some selectable menu items via the processor 106 (to be described later), and the user selects a desired story at the console 103 (step S1802).

After the story is selected, some background scenes, feature players, and the like (objects) corresponding to that story, which are stored in the storage unit 105, are displayed on the display screen of the display 104 via the processor 106, and the user selects a desired background scene, feature player, and the like at the console 103 (step S1803). In place of displaying the stories, background scenes, and the like, they may be announced by voice using the speaker (or earphone) 107, and the user may input his or her choice via the microphone 108.

After the story, background scene, feature player, and the like are determined, the motion and voice of the user corresponding to the story are captured as digital moving image information using the camera 102 and the microphone 108. The captured digital information is extracted and compressed by the processor 106 (step S1804).

The processor 106 composites the compressed sensed information with the selected background scene and feature player and plays back the information using the display 104 and speaker 107 (step S1805). The apparatus prompts the user to check if the playback information is OK. If the user inputs a re-input instruction at the console 103, the process can be repeated from step S1802, S1803, or S1804 (step S1806). Note that this repetition process may be omitted, and the process may be done only once. Alternatively, the flow may return to step S1801, and the user may select a repetition process by inserting extra money.

If the user inputs a confirmation instruction of the playback information, he or she then inputs an instruction for executing a copyright protection process for individual objects at the console 103 (step S1807). In this process, when the story or objects selected in steps S1802 and S1803 are specially set to protect their copyrights, an extra charge process for these copyrights, a process for setting a copy count corresponding to the extra charge upon copying or transmitting objects, an encryption process of objects and the like are done. The extra charge process for copyrights can be implemented by displaying comments that pertain to copyrights, their use fees, and the like on the display 104, calculating the amount of extra money to be paid by the user, and prompting the user to insert the extra fee from the insertion port 101. In this embodiment, in order to simplify the processing flow, processes associated with copyright protection are executed together in step S1807, but may be distributed to processes in steps S1801 to S1806 and S1808.

For example, upon selecting a story or objects in steps S1802 and S1803, a display process of a message indicating that the story or objects the user is about to select is copyrighted, and an extra charge process may be done. A charge process by coin insertion in step S1801 may be done simultaneously in this step in place of the first step of the flow. A copyrighting process is done by the copyright protection unit 100, and its example will be explained later. Finally, the playback information is sent via the communication unit 109 (step S1808).

Figure 18:
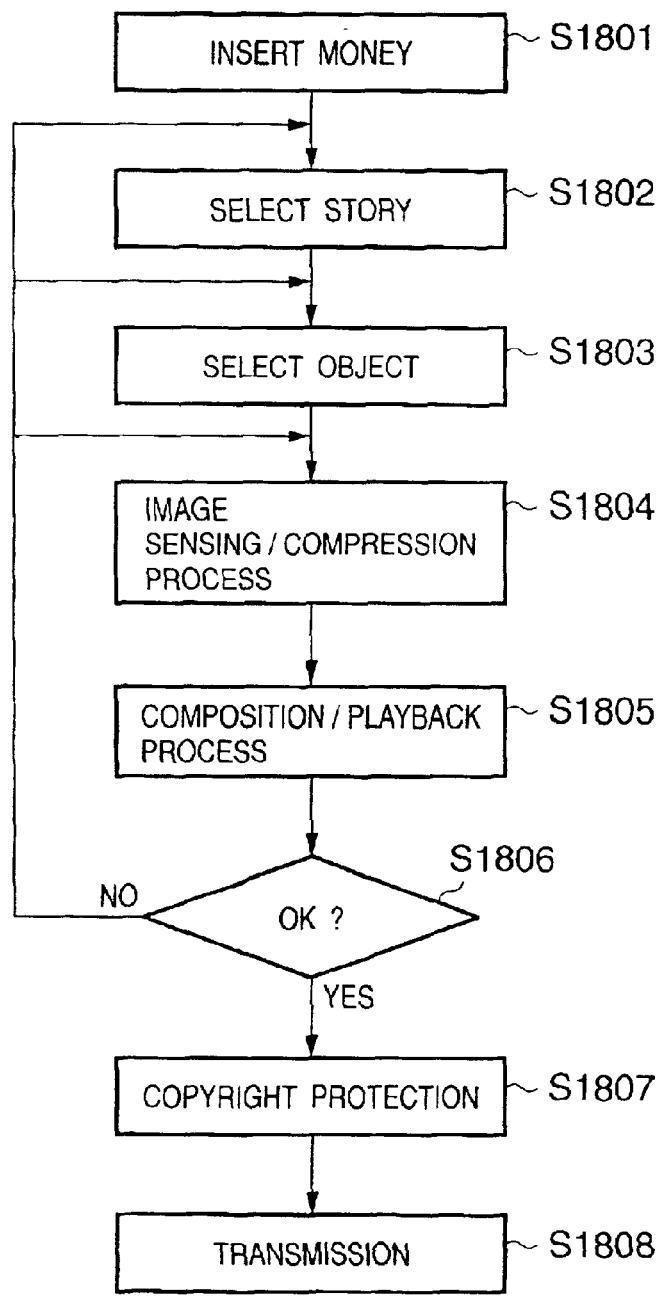
FIG. 18 is a flow chart showing the operation flow of the moving image output apparatus of the fifth embodiment.

In the above description, the respective units 101 to 109, and the operation shown in FIG. 18 are controlled by the controller 110 which comprises a CPU, a ROM/RAM for storing programs, and the like.

Note that a method of compositing a plurality of objects is based on MPEG-4 as in the first embodiment, and a detailed description thereof will be omitted.

When object data are copyrighted, an MPEG-4 player must limit playback. In MPEG-4, a mechanism called IPMP (Intellectual Property Management & Protection) has been proposed for copyright protection, and this embodiment uses this mechanism.

Figure 19:
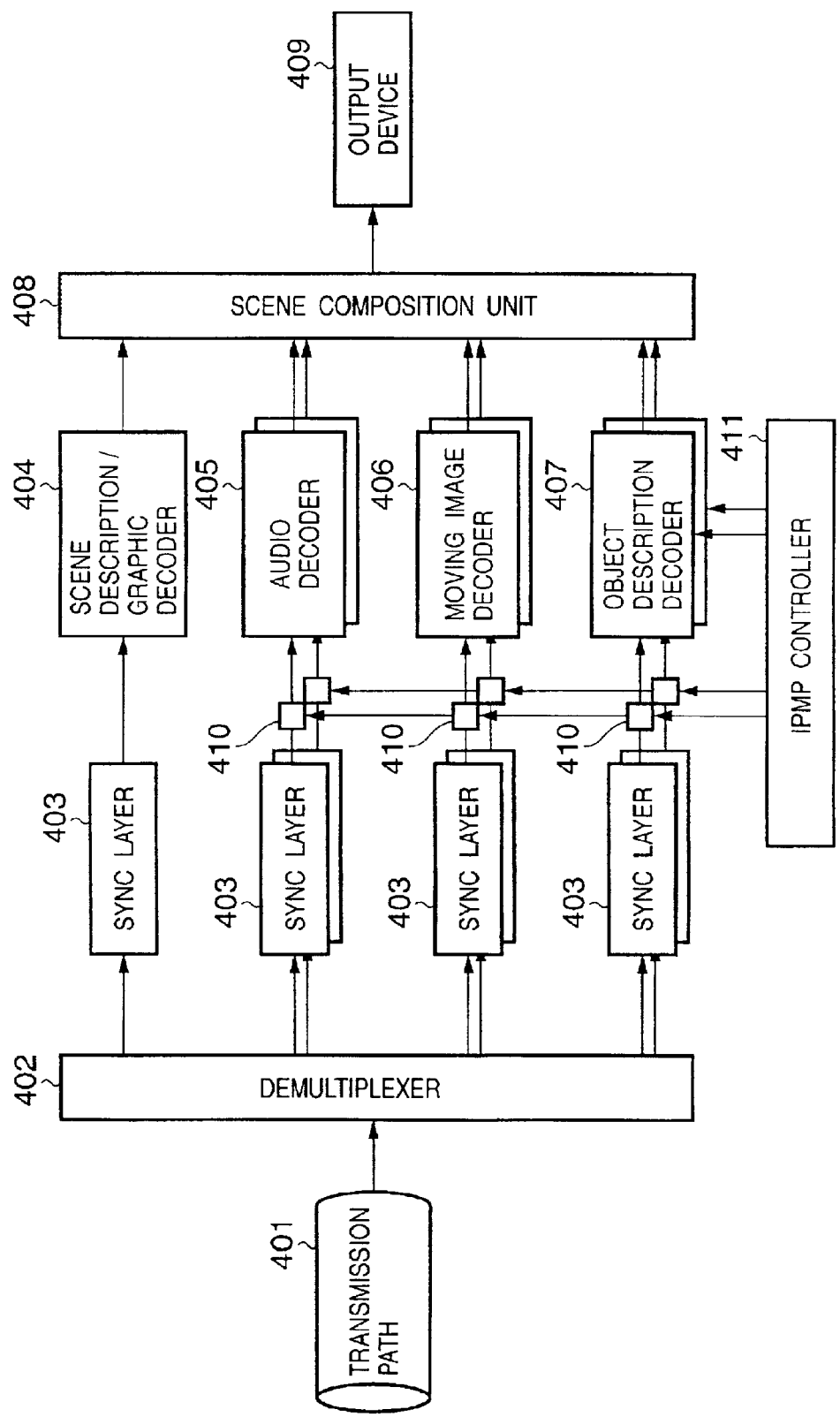
FIG. 19 is a block diagram of an MPEG-4 player in the fifth embodiment.

FIG. 19 shows a schematic arrangement of a general MPEG-4 player. A transmission path 401 is a data path such as various networks, computer bus, and the like, and is a network to which an MPEG-4 stream is input. Note that the transmission path 401 also means an interface between the player and a recording medium device such as a CD-ROM, DVD-ROM, DVD-RAM, or the like in addition to the communication path. In the player, an MPEG-4 stream delivered from the network or played back from the recording medium device is input to a demultiplexer 402. The MPEG-4 stream is demultiplexed by the demultiplexer 402 into scene description data, moving image (video) object data, audio object data, object description data, and the like, which are respectively input to corresponding sync layer blocks (buffer memories) 403. Note that the audio object data has undergone high-efficiency (compression) coding such as known CELP (Code Excited Linear Prediction) coding, transform-domain weighted interleave vector quantization (TWINVQ) coding, or the like. Also, the moving image object data has undergone high-efficiency coding by, e.g., known MPEG-2, H-263, or the like.

The respective object data of the sync layer blocks 403 are input to corresponding decoders 404 to 407. The decoders 404 to 407 decode the aforementioned scene description data, moving image object data, audio object data, and the like which have undergone high-efficiency coding. In FIG. 19, this embodiment assumes an apparatus which can decode these objects even when the MPEG-4 bitstream contains a plurality of different types of objects in each of audio objects, moving image objects, and object description data. For this reason, a plurality of sets of sync layer blocks and decoders 404 to 407 are prepared in correspondence with audio objects, moving image objects, and object description data, but they can be modified depending on the systems used.

The audio objects, moving image objects, and object description data decoded by the decoders 405 to 407 undergo a composition/graphic process in a scene composition unit 408 on the basis of the scene description data decoded by the scene description decoder 404. A final data sequence obtained in this way is supplied to an output device 409 such as a display, printer, or the like, and is visualized and made audible.

When individual object data such as audio objects, moving image objects, and the like that form a scene must undergo control for executing or stopping playback for copyright protection, IPMP information is used. The IPMP information is transferred using an IPMP stream as a building component of the received data stream. An IPMP controller 411 intercepts bitstreams at control points 410 or accesses the decoders 405 to 407 to command them to stop decoding as needed on the basis of IPMP information contained in the IPMP stream from the demultiplexer 402. For this reason, if it is determined based on the IPMP information that the user is not authorized to view the data, since data cease to be decoded, playback stops. With this control, copyrighted data are protected.

Copyright protection of the copyright protection unit 100 is done as follows. As described above, individual objects to be played back are controlled by the IPMP information. Hence, copyrighted objects can be protected by the IPMP information.

Furthermore, the copy count or transmission count of each object can be controlled as follows. Control of the copy count or transmission count has not been standardized yet in the IPMP information. Hence, control is made using the following mechanism.

COP (Copy & Output Protection) information for controlling the copy count and transmission count is appended to each object in addition to the IPMP information, and upon transmitting an object, the communication unit 109 is controlled by the COP information. For example, when the COP information describes an allowable transmission count which is not zero, an object is allowed to be transmitted, and the allowable transmission count is decremented by 1 to update the COP information. If the allowable transmission count is zero, the operation of the communication unit 109 is stopped, or the storage unit 105 is controlled to stop read of that object therefrom. When the multiplexer 306 is used, it is controlled to exclude that object from those to be multiplexed. The default value and updated value of the COP information can be set depending on money information obtained by detecting money inserted from the insertion port 101.

Therefore, the copyright protection unit 100 can comprise units (IPMP information generator 1101 and COP information generator 1102) for generating IPMP information and COP information according to predetermined formats. If future standardization of MPEG-4 allows to control the copy count or playback information, the same process can be implemented using that information. Also, the IPMP information generator 1101 and COP information generator 1102 are controlled by the controller 110.

Also, objects may be encrypted for copyright protection. In this case, the copyright protection unit 100 can comprise an encryption unit 1104. Key information used to decrypt the encrypted object can be generated by a key information generator 1103, and can be managed and exchanged together with the IPMP information and COP information.

With the aforementioned arrangement of the moving image output apparatus and its control method, objects having copyrights and/or rights of likeness can be protected, and a scene containing the protected objects can be generated.

Figure 20:
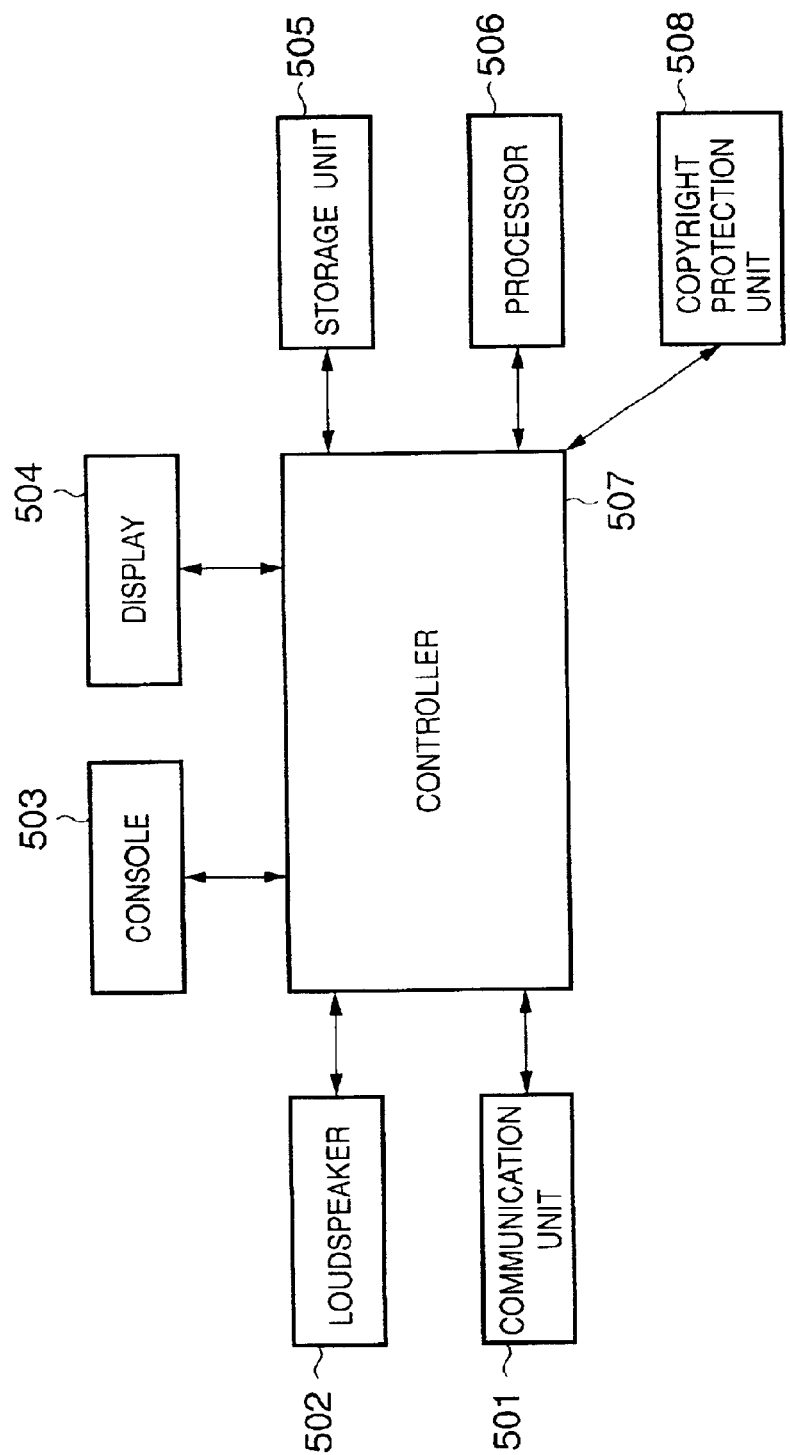
FIG. 20 is a block diagram of a portable terminal in the fifth embodiment.
Figure 21:
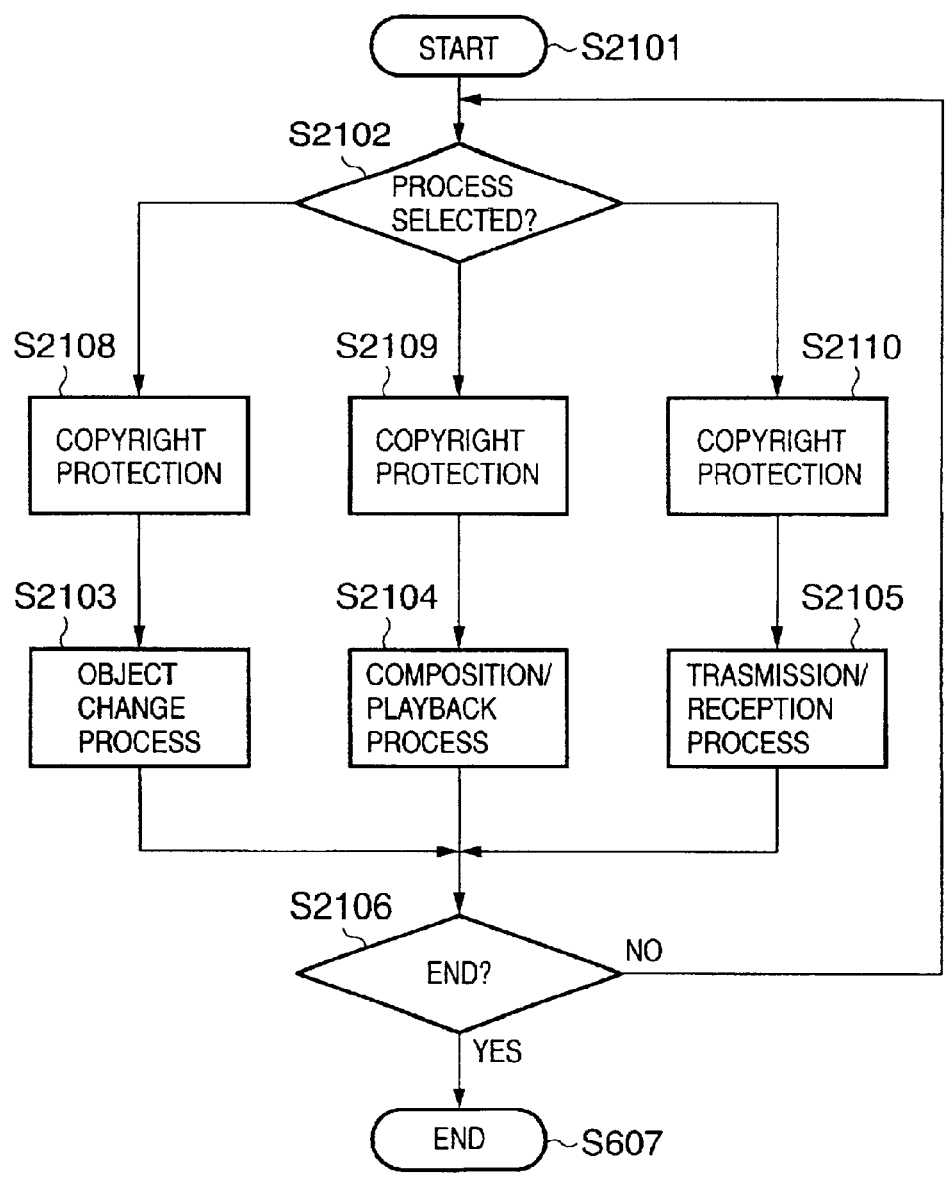
FIG. 21 is a flow chart showing the operation flow of the portable terminal in the fifth embodiment.
Figure 22:
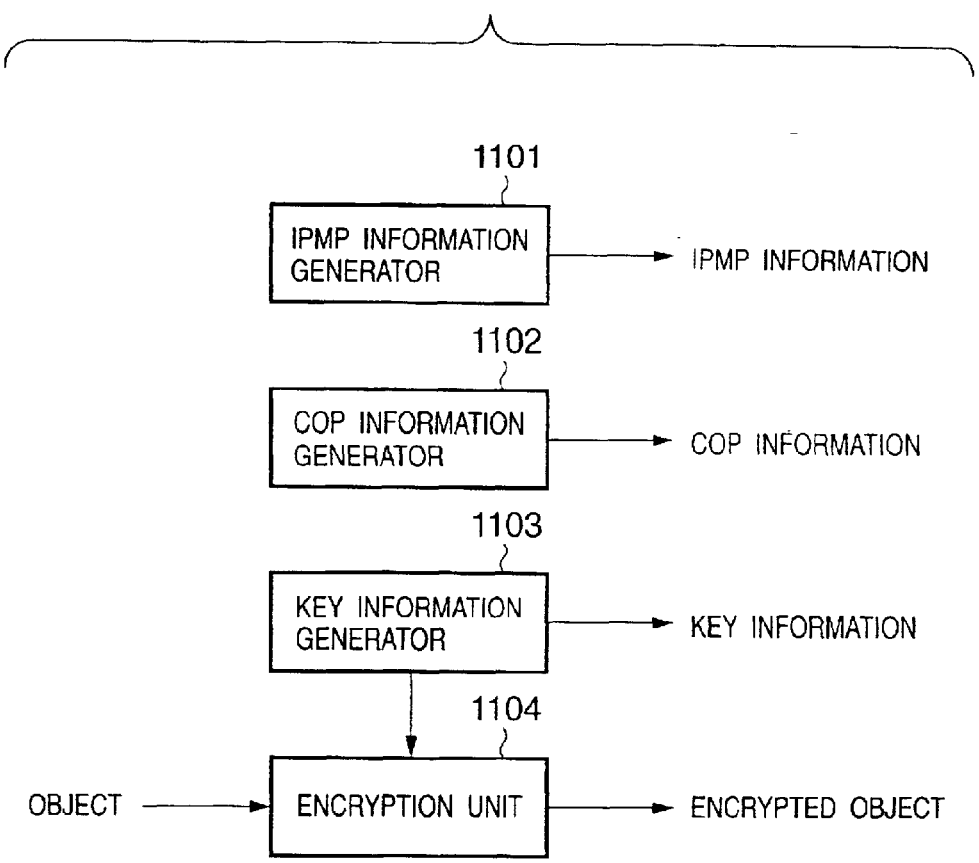
FIG. 22 is a block diagram of a copyright protection unit of a moving image processing apparatus of the fifth embodiment.

FIG. 20 is a block diagram of a portable terminal (moving image playback apparatus) as the user's terminal, and FIG. 21 shows its operation flow. The difference from the arrangement in FIG. 5 is that a copyright protection unit 508 is added. Note that program codes according to the flow chart of FIG. 21 are stored in a storage unit 505 (to be described later), and are loaded onto a RAM (not shown) and executed upon operation of the portable terminal. The portable terminal has a function of exchanging generated objects, and a function of allowing the user to individually enjoy contents by compositing/playing them back.

The portable terminal of this embodiment can display some processing menu items on a display 504, and the user can select a process using a console 503. The menu includes a process for sending/receiving objects, a process for compositing/playing back a moving image, a process for changing each object, and the like. The menu can also include an item that pertains to copyright protection.

Referring to FIG. 21, assume that the user selects a transmission/reception process (step S2105) in the process select step (step S2102) after the process starts (step S2101). In this process, objects are received from a moving image output apparatus (aforementioned amusement apparatus) or another portable terminal, or objects are sent to another terminal using a communication unit 501.

A case will be examined below wherein objects (containing BIFS corresponding to a story) generated by another apparatus or terminal are received. A transmission/reception instruction is issued at the console 503, and objects received via the communication unit 501 are stored in the storage unit 505 (in the transmission process, objects which are stored in the storage unit 505 and are designated using the display 504 or console 503 are sent to another portable terminal via the communication unit 501). In order to confirm objects to be transmitted/received, the video and audio of those objects may be played back via a processor 506 (to be described later), and may be stored or transmitted after confirmation. Prior to such transmission/reception, a copyright protection process (step S2110) is executed. In this copyright protection process, if an object to be transmitted is copyrighted, and especially has a limited transmission count, it is controlled by the aforementioned COP information. That is, the object is transmitted when the allowable transmission count in the COP information is not zero, and the allowable transmission count is decremented by 1 to update the COP information. When the allowable transmission count is zero, the operation of the communication unit 501 is stopped or the storage unit 505 is controlled to stop its input The copyright protection process that pertains to the COP information is executed by the copyright protection unit 508.

A case will be examined below wherein a composition/playback process (step S2104) is selected. In this process, objects which are stored in the storage unit 505 and form the story are played back using the display 504 or speaker 502 via the processor 506. Note that the processor 506 can be implemented by the scene composition unit 1001 in FIG. 10. When an object to be played back is to undergo playback control by IPMP information, encryption, or the like, the processor 506 is controlled by the copyright protection unit 508 (step S2109).

A case will be examined below wherein an object change process (step S2103) is selected. In this process, when new objects are added via a communication with another terminal in step S2105, objects in one story stored in the storage unit 505 are replaced by these new objects, or the new objects are added to that story. Such process is implemented by rewriting information called a descriptor which indicates the attribute of each object or information described in BIFS within an allowable range. In the object change process as well, if the object is protected by IPMP or the like, the processor 506 that executes the aforementioned process is controlled by the copyright protection unit 508 (step S2108).

Whether or not a series of processes mentioned above is to end is confirmed, and another process can be repeated (step S2106). For example, after some objects are received from the amusement apparatus of the embodiment mentioned above or another portable terminal and are stored by the transmission/reception process in step S2105, the process may proceed to confirm the contents of the received objects by selecting the composition/playback process in step S2104. Furthermore, the composition/playback process in step S2104 may be repeated while executing the object change process in step S2103. Finally, the process ends. If it is determined in the copyright protection process in step S2108, S2109, or S2110 that the process cannot proceed, the flow skips the next process, and returns to process selection in step S2102 to execute another process.

When information received from the amusement apparatus or the like is an MPEG-4 stream multiplexed by the multiplexer 306 in FIG. 3, the processor 506 may include the demultiplexer 402. The outputs from the demultiplexer are supplied not to the sync layer blocks but to the storage unit 505. A controller 507, which comprises a CPU, a ROM/RAM for storing programs, and the like, controls the respective units 501 to 506, and the operation shown in FIG. 21.

Figure 23:
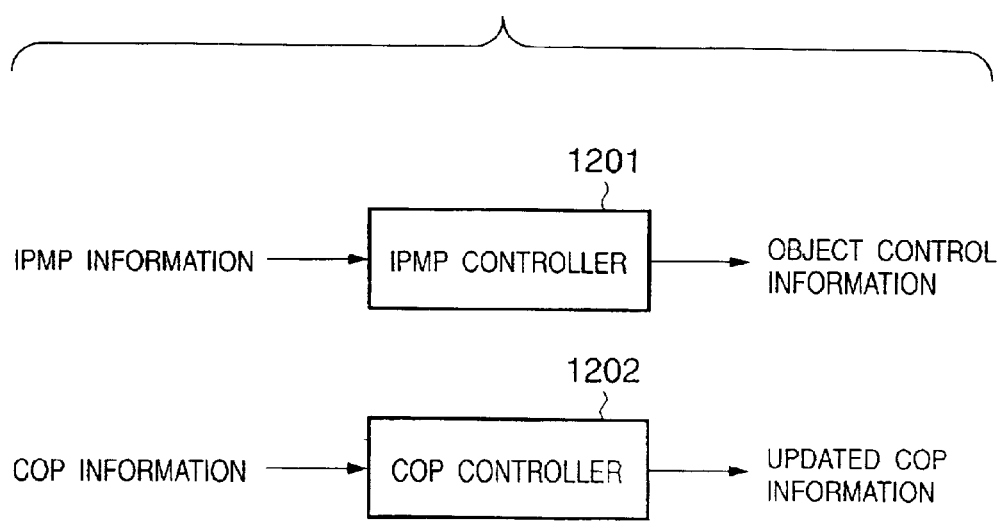
FIG. 23 is a block diagram of a copyright protection unit of a portable terminal of the fifth embodiment.

The copyright protection unit 508 comprises a COP information controller 1202 for updating/controlling COP information, and an IPMP controller 1201 for controlling objects in accordance with IPMP information, as shown in FIG. 23. When objects are encrypted, the unit 508 may also comprise a decryption unit for decrypting encrypted objects using key information received together with the COP information and IPMP information.

With the aforementioned arrangement of the portable terminal and its control method, a scene containing objects, copyrights or rights of likeness are protected, can be played back.

Also, a moving image processing system constructed using some of the moving image output apparatus, the portable terminal (moving image playback apparatus) of this embodiment, and a personal computer (to be referred to as a PC hereinafter) having functions to be described later can be applied to FIGS. 7 to 9. Also, such system can be applied to the second to fourth embodiments.

With the aforementioned moving image processing system and its control method, an object edit system that exchanges objects among systems, edits them, and exchanges edited objects again can be built.

[Another Embodiment]

The objects by means of the apparatuses and their control methods in the above embodiments are achieved not only by a method of combining the apparatuses and their control method but also by supplying a program code of software that can implement the functions of the above-mentioned embodiments to a computer (or a CPU or MPU) in the system or apparatus, and making the computer control various devices in the system or apparatus.

In this case, the program code itself read out from the storage medium implements the functions of the above-mentioned embodiments, and the program code itself, and means for supplying the program code to the computer (i.e., a storage medium which stores the program code) are included in the scope of the embodiments.

As the storage medium for storing the program code, for example, a floppy disk, hard disk, optical disk, magneto-optical disk, CD-ROM, magnetic tape, nonvolatile memory card, ROM, and the like may be used.

The program code is included in the scope of the embodiments not only when the functions of the above embodiments are implemented by controlling various devices according to the supplied program code alone but also when the functions of the embodiments are implemented by collaboration of the program code and an OS (operating system) or another application software running on the computer.

Furthermore, the program code is included in the scope of the present invention when the functions of the above-mentioned embodiments are implemented by some or all of actual processing operations executed by a CPU or the like arranged in a function extension board or a function extension unit, which is inserted in or connected to the computer, after the supplied program code is written in a memory of the extension board or unit.

As described above, according to the above embodiments, an amusement system designed for moving images can be easily built. Also, moving image information obtained by compositing a moving image of the user himself or herself and objects selected by the user can be generated.

Since the above embodiment uses MPEG-4 as a compression/transmission scheme of moving images, a moving image amusement system which can reduce the storage size, can easily composite moving images, allows the portable terminal to easily use a moving image, and can easily exchange data in units of objects can be built. Using MPEG-4, the information size can be reduced, and information can be provided by sending it to the user's terminal or the network address of, e.g., the Internet, thus allowing the user to freely use that information.

Furthermore, since the information to be provided has information indicating use conditions of objects, object copyrights can be protected and their copy counts or the like can be limited.

As many apparently widely different embodiments of the present invention can be made without departing from the spirit and scope thereof, it is to be understood that the invention is not limited to the specific embodiments thereof except as defined in the appended claims.

What is claimed is:

1. A moving image generation apparatus comprising:
   storage means for storing a plurality of compressed objects which specify stream information with respect to a time axis;
   input means for inputting video data of a moving image obtained by predetermined image sensing means as the object; and
   output means for multiplexing at least one desired object of the objects stored in said storage means and the object input by said input means and outputting the multiplexed objects as single stream information.

2. The apparatus according to claim 1, wherein said output means complies with MPEG-4.

3. The apparatus according to claim 1, wherein the objects stored in said storage means include video data of a background and feature player.

4. The apparatus according to claim 1, wherein said input means includes audio input means.

5. The apparatus according to claim 1, wherein the stream information output by said output means is described in BIFS (Binary Format For Scenes).

6. The apparatus according to claim 1. wherein said output means outputs the information to an information terminal prepared by a user.

7. The apparatus according to claim 1, wherein said output means outputs the information to a network address designated by a user.

8. The apparatus according to claim 1, further comprising money insertion means used to insert a predetermined generation fee, and wherein when money is inserted via said money insertion means, a series of operations are executed.

9. The apparatus according to claim 1, wherein said storage means contains description files that describe playback operations of a plurality of scenes, objects of a plurality of background scenes, and moving image objects of a plurality of feature players, and said output means includes means for displaying a select menu for selecting the objects.

10. The apparatus according to claim 9, wherein selectable feature player objects of the objects stored in said storage means are stored to be able to be selected from objects depending on the selected background scene.

11. The apparatus according to claim 1, further comprising means for downloading objects from a server on a network, and updating the objects stored in said storage means with the downloaded objects.

12. An apparatus for playing back information from a moving image generation apparatus cited in claim 1, comprising:
    reception means for receiving information created by said moving image generation apparatus; and
    playback means for compositing and playing back objects contained in the received information.

13. The apparatus according to claim 12, further comprising means for modifying a desired object in stream information received by said reception means.

14. A portable terminal comprising a moving image playback apparatus cited in claim 12.

15. A control method of a moving image generation apparatus, comprising:

a selection step of selecting at least one desired object from storage means for storing a plurality of compressed objects which specify stream information with respect to a time axis;

an input step of inputting video data of a moving image obtained by predetermined image sensing means as the object; and an output step of multiplexing the object input by the imaging sensing means and the object selected in the selection step, and outputting the multiplexed objects as single stream information.

16. A control method of an apparatus for playing back information from a moving image generation apparatus cited in claim 15, comprising:

a reception step of receiving information created by said moving image generation apparatus;

a playback step of compositing and playing back objects contained in the received information; and a step of modifying a desired object in received stream information.

17. A computer readable storage medium for storing a computer program which makes a computer function as a moving image generation apparatus when the program is read and executed by the computer, the computer program comprising:

a program code of a selection step of selecting at least one desired object from storage means for storing a plurality of compressed objects which specify stream information with respect to a time axis;

a program code of an input step of inputting video data of a moving image obtained by predetermined image sensing means as the object; and a program code of an output step of multiplexing the object input by the imaging sensing means and the object selected in the selection step, and outputting the multiplexed objects as single stream information.

18. The computer readable storage medium for storing a computer program which makes a computer function as an apparatus for playing back information from a moving image generation apparatus cited in claim 17, the computer program further comprising:

a program code of a reception step of receiving information created by said moving image generation apparatus;

a program code of a playback step of compositing and playing back objects contained in the received information; and a program code of a step of modifying a desired object in received stream information.

19. A moving image output apparatus comprising:

storage means for storing various object data;

input means for inputting moving image data sensed by predetermined image sensing means;

information generation means for generating information data that pertains to a user condition of the object data; and output means for outputting stream data by multiplexing the object data stored in said storage means, the moving image data input by said input means, and the information data generated by said information generation means.

20. The apparatus according to claim 19, wherein said output means complies with MPEG-4.

21. The apparatus according to claim 19, wherein the objects stored in said storage means include video data of a background and feature player.

22. The apparatus according to claim 19, wherein said input means includes audio input means.

23. The apparatus according to claim 19, wherein the stream data output by said output means is described in BIFS (Binary Format For Scenes).

24. The apparatus according to claim 19, wherein said output means outputs the data to an information terminal prepared by a user.

25. The apparatus according to claim 19, wherein said output means outputs the data to a network address designated by a user.

26. The apparatus according to claim 19, wherein the moving image data input by said input means is data corresponding to a desired object extracted from one frame.

27. The apparatus according to claim 19, wherein said information generation means generates IPMP (Intellectual Property Management & Protection) information.

28. The apparatus according to claim 19, further comprising:

informing means for informing a generation fee of the stream data; and detection means for detecting inserted money information that pertains to inserted money.

29. The apparatus according to claim 28, wherein said information generation means generates COP (Copy & Output Protection) information.

30. The apparatus according to claim 28, wherein said information generation means generates the COP information in accordance with the inserted money information.

31. The apparatus according to claim 28, wherein said output means is controlled by the COP information.

32. The apparatus according to claim 19, further comprising encryption means for encrypting the object data in accordance with the information generated by said information generation means.

33. An apparatus for playing back stream data from a moving image output apparatus cited in claim 19, comprising:

input means for inputting stream data; and playback means for compositing and playing back objects contained in the stream data.

34. The apparatus according to claim 33, further comprising means for modifying a desired object in the stream data input by said input means.

35. A portable terminal comprising a moving image playback apparatus cited in claim 33.

36. A control method of a moving image output apparatus, comprising:

a storage step of storing various object data in storage means;

an input step of inputting moving image data sensed by predetermined image sensing means;

an information generation step of generating information data that pertains to a user condition of the object data; and an output step of outputting stream data by multiplexing the object data stored in the storage means, the moving image data input in the input step, and the information data generated in the information generation step.

37. A control method for a moving image playback apparatus for playing back stream data from a moving image output apparatus cited in claim 36, comprising:

an input step inputting stream data; and a playback step of compositing and playing back objects contained in the stream data.

38. A computer readable storage medium for storing a computer program which functions as a moving image output apparatus for outputting stream data, the computer program comprising:

a program code of a storage step of storing various object data in storage means;

a program code of an input step of inputting moving image data sensed by predetermined image sensing means;

a program code of an information generation step of generating information data that pertains to an user condition of the object data; and a program code of an output step of outputting stream data by multiplexing the object data stored in the storage means, the moving image data input in the input step, and the information data generated in the information generation step.

39. The computer readable storage medium for storing a computer program which functions as a moving image playback apparatus for playing back stream data from a moving image output apparatus cited in claim 38, the computer program further comprising:

a program code of an input step inputting stream data; and a program code of a playback step of compositing and playing back objects contained in the stream data.

* * * * *

UNITED STATES PATENT AND TRADEMARK OFFICE
CERTIFICATE OF CORRECTION

PATENT NO. : 7,106,906 B2
APPLICATION NO. : 09/797717
DATED : September 12, 2006
INVENTOR(S) : Keiichi Iwamura Page 1 of 1

It is certified that error appears in the above-identified patent and that said Letters Patent is hereby corrected as shown below:

DRAWINGS:
Sheet 6, Figure 6 and Sheet 20, Figure 21, "TRASMISSION/" should read
-- TRANSMISSION/ --.

COLUMN 6:
Line 56, "are-transmitted" should read -- are transmitted --.

COLUMN 9:
Line 32, "potable" should read -- portable --; and
Line 43, "of-the" should read -- of the --.

COLUMN 14:
Line 16, "input" should read -- input. --.

COLUMN 20:
Line 2, "an user" should read -- a user --.

Signed and Sealed this

Twenty-sixth Day of June, 2007

JON W. DUDAS
*Director of the United States Patent and Trademark Office*